United States Patent
Wang et al.

(10) Patent No.: US 12,436,781 B2
(45) Date of Patent: Oct. 7, 2025

(54) METHOD AND APPARATUS FOR PROCESSING INTERACTION EVENT

(71) Applicant: Huawei Technologies Co., Ltd., Shenzhen (CN)

(72) Inventors: Kaitong Wang, Shanghai (CN); Duoxian Li, Shanghai (CN); Shaofei Ma, Wuhan (CN); Zhang Gao, Shanghai (CN); Xiaoxiao Chen, Nanjing (CN); Qichao Yang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/180,653

(22) Filed: Mar. 8, 2023

(65) Prior Publication Data

US 2023/0244507 A1  Aug. 3, 2023

Related U.S. Application Data

(63) Continuation of application No. PCT/CN2021/111733, filed on Aug. 10, 2021.

(30) Foreign Application Priority Data

Sep. 9, 2020  (CN) .......................... 202010945205.2

(51) Int. Cl.
 *G06F 9/451* (2018.01)
 *G06F 3/0485* (2022.01)
 *G06F 9/54* (2006.01)

(52) U.S. Cl.
 CPC ............ *G06F 9/451* (2018.02); *G06F 3/0485* (2013.01); *G06F 9/541* (2013.01)

(58) Field of Classification Search
 CPC ........ G06F 9/451; G06F 3/0485; G06F 9/541; G06F 8/38; G06F 9/542; G06F 9/54; G06F 9/543
 See application file for complete search history.

(56) References Cited

U.S. PATENT DOCUMENTS 9,733,916 B2 * 8/2017 Wang ........................ G06F 8/38
11,520,575 B2 * 12/2022 Lin ............................ G06F 8/65
(Continued)

FOREIGN PATENT DOCUMENTS

CA    2788899 A1 *  8/2011  ............... G06F 8/60
CN    104778044 A     7/2015
(Continued)

OTHER PUBLICATIONS

Ntanos et al., "A Context Awareness Framework for Cross-Platform Distributed Applications", publisher: Elsevier, published: 2013, pp. 1-9. (Year: 2013).*

*Primary Examiner* — Wilson W Tsui
(74) *Attorney, Agent, or Firm* — Slater Matsil, LLP

(57) ABSTRACT

This application provides a method and apparatus for processing an interaction event. The method may be performed by a unified interaction framework. Behavior identification of the interaction event is performed by the unified interaction framework, and a widget may directly execute the interaction behavior identified by the unified interaction framework. The widget does not need to adapt to an interactive device. When a software system needs to adapt to a newly added interactive device, a developer can perform adaptation development on the unified interaction framework once to adapt the newly added interactive device for a plurality of widgets.

20 Claims, 9 Drawing Sheets

(56) References Cited

U.S. PATENT DOCUMENTS

| | | | | |
|---|---|---|---|---|
| 2002/0054148 A1* | 5/2002 | Okada | ............... | G06F 9/453 |
| | | | | 715/810 |
| 2009/0027334 A1* | 1/2009 | Foulk | ............... | G06F 3/04886 |
| | | | | 345/157 |
| 2009/0249359 A1* | 10/2009 | Caunter | ............... | G06F 9/542 |
| | | | | 715/764 |
| 2011/0214092 A1* | 9/2011 | Palmer | ............... | G06F 9/451 |
| | | | | 715/863 |
| 2012/0102428 A1* | 4/2012 | Stewart | ............... | G06F 3/0481 |
| | | | | 715/781 |
| 2018/0341369 A1* | 11/2018 | Johnston | ............... | G06F 16/2228 |
| 2019/0369829 A1 | 12/2019 | Turner et al. | | |

FOREIGN PATENT DOCUMENTS

| | | |
|---|---|---|
| CN | 106020633 A | 10/2016 |
| CN | 110404260 A | 11/2019 |

\* cited by examiner

METHOD AND APPARATUS FOR PROCESSING INTERACTION EVENT

CROSS-REFERENCE TO RELATED APPLICATIONS

This application is a continuation of International Application No. PCT/CN2021/111733, filed on Aug. 10, 2021, which claims priority to Chinese Patent Application No. 202010945205.2, filed on Sep. 9, 2020. The disclosures of the aforementioned applications are hereby incorporated by reference in their entireties.

TECHNICAL FIELD

This application relates to the field of electronic technologies, and specifically, to a method and apparatus for processing an interaction event.

BACKGROUND

When a user performs an operation on a user interface (UI), an application (APP) needs to respond to the operation of the user, to complete interaction with the user. An Android (Android®) system performs user interaction by using an event-driven method. For example, a tap operation performed by the user on a touchpad triggers the Android system to generate an ACTION_DOWN event and an ACTION_UP event. The Android system senses and processes the two events by using an Android application framework, and then sends the two events to a corresponding widget. The widget identifies the two events, determines that a corresponding behavior is object selection, and may control an APP to select an object through an application programming interface (API).

In the foregoing example, the widget needs to perform mapping from an event to a behavior. Therefore, when the Android system needs to adapt to a newly added interactive device, a developer needs to develop, for each widget, an adaptation capability for the newly added interactive device. Consequently, development workload is heavy.

SUMMARY

This application provides a method for processing an interaction event, to reduce workload of adapting to an interactive device and improve interaction experience consistency.

According to a first aspect, a method for processing an interaction event is provided. The method includes: obtaining at least one interaction event; determining an interaction behavior corresponding to the at least one interaction event; and invoking a widget corresponding to the interaction behavior to execute the interaction behavior.

The foregoing method may be performed by, for example, a unified interaction framework. The unified interaction framework may obtain the at least one interaction event from an Android application framework, perform behavior identification on the at least one interaction event, and determine the interaction behavior corresponding to the at least one interaction event. Subsequently, the unified interaction framework may invoke the widget to execute the interaction behavior. In this embodiment, behavior identification of the interaction event is performed by the unified interaction framework, and the widget may directly execute the interaction behavior identified by the unified interaction framework. Therefore, the widget does not need to adapt to an interactive device. When an Android system needs to adapt to a newly added interactive device, a developer can perform adaptation development on the unified interaction framework once to adapt the newly added interactive device for a plurality of widgets, so that development workload is reduced.

Optionally, the invoking a widget corresponding to the interaction behavior to execute the interaction behavior includes: invoking, through a behavior enable API registered by the widget, the widget to execute the interaction behavior.

The behavior enable API is an interface used for interaction between the unified interaction framework and the widget. The widget may register the behavior enable API with the unified interaction framework. The unified interaction framework calls back the behavior enable API, to invoke the widget to execute the interaction behavior.

Optionally, the method further includes: configuring an enable API and/or a registration callback API by using a domain specific language (DSL) profile, where the widget can be invoked by an APP through the enable API, and the widget can invoke the APP through the registration callback API.

A software development kit (SDK) used by some third-party APPs during development is not a Huawei SDK, and these APPs cannot invoke a newly added API (for example, an enable API and/or a registration callback API for enhancing an interaction capability of a widget) of an emotion user interface (EMUI). The EMUI may parse a profile through a DSL engine, and configure the enable API and/or the registration callback API based on configuration information in the profile. In this way, the widget can interact with the third-party APP through the registration callback API, and the third-party APP can also interact with the EMUI widget through the enable API. When the interaction behavior relates to application data refreshing, the unified interaction framework may invoke, through the behavior enable API registered by the widget, the widget to execute the interaction behavior. Then, the widget may invoke a third-party APP through the registration callback API configured based on a DSL file to complete data refreshing, so as to implement function enhancement of the widget.

Optionally, before the invoking a widget corresponding to the interaction behavior to execute the interaction behavior, the method further includes: receiving registration information from the widget, where the registration information indicates a correspondence between the interaction behavior and the widget.

The widget may send the registration information to the unified interaction framework to change a correspondence between the widget and an interaction behavior, so that a concerned interaction behavior can be flexibly changed.

Optionally, the method further includes: generating a behavior parameter based on an event value of the at least one interaction event; and sending the behavior parameter to the widget.

Some interaction events have event values. In this case, the unified interaction framework may generate, based on the event values of these interaction events, behavior parameters corresponding to the event values. For example, if an interaction event triggered by dragging by a user on a touchpad includes a drag amplitude value (an example of the event value, used to indicate a drag distance of the user), the unified interaction framework may generate a behavior parameter including a movement length value of a progress bar. After obtaining the behavior parameter, a widget can control, based on the behavior parameter, the progress bar to perform normalization interaction, to enhance user experience.

Optionally, the behavior parameter includes a behavior amplitude value, the behavior amplitude value is positively correlated to the event value of the at least one interaction event, the behavior amplitude value is positively correlated to a transform coefficient, and there is a correspondence between the transform coefficient and a type of an interactive device corresponding to the at least one interaction event.

The behavior amplitude value is, for example, a drag length value of a progress bar. Because UI sizes of different interactive devices are different, when drag amplitude values are the same, if the drag amplitude value is directly used to control drag lengths of progress bars, drag lengths of progress bars of some interactive devices do not match UI sizes of these interactive devices. In this embodiment, the event value is processed based on the transform coefficient to generate the behavior amplitude value. Different interactive devices have different transform coefficients, so that the behavior amplitude value obtained after the event value is processed matches a UI size of the interactive device, and a user experience effect is enhanced.

Optionally, the correspondence between the transform coefficient and the type of the interactive device includes: the transform coefficient is positively correlated to a UI size of the interactive device.

Interactive devices may be classified into large-screen devices and small-screen devices based on UI sizes. A UI size of the large-screen device is large, and the unified interaction framework may process an event value by using a large transform coefficient, to obtain a large behavior amplitude value. A UI size of the small-screen device is small, and the unified interaction framework may process an event value by using a small transform coefficient, to obtain a small behavior amplitude value. Therefore, in this embodiment, the behavior amplitude value obtained after the event value is processed matches the UI size of the interactive device, and the user experience effect is enhanced.

Optionally, the at least one interaction event includes a plurality of interaction events, and the interaction behavior includes: a combined interaction behavior of the plurality of interaction events.

The plurality of interaction events may be generated by different interactive devices. For example, when the user implements image zooming by using a Ctrl key and a mouse scroll wheel, the at least one interaction event obtained by the unified interaction framework is a Ctrl event and a mouse scroll wheel event. When the user implements image zooming by using a Ctrl key and a W key, the at least one interaction event obtained by the unified interaction framework is a Ctrl event and a W event. The unified interaction framework may control, by using a combination of the Ctrl event and the mouse scroll wheel event, an ImageView widget to perform image zooming, or may control, by using a combination of the Ctrl event and the W event, the ImageView widget to perform image zooming. The ImageView widget does not need to sense a specific type of an interactive device. The ImageView widget applicable to a keyboard and a mouse is also applicable to a single keyboard scenario. The widget and the APP do not require secondary development, so that interaction adaptation workload is reduced.

Optionally, the at least one interaction event includes a start scroll event, an intermediate scroll event, and an end scroll event. The start scroll event is a scroll event detected for the first time after a scroll listener is started, or a scroll event generated for the first time after an end scroll event is generated. The intermediate scroll event is a scroll event generated within a preset time period after the start scroll event is generated. The end scroll event is a scroll event fitted when no scroll event is generated within the preset time period after the start scroll event or the intermediate scroll event is generated. The interaction behavior includes: pre-scrolling processing corresponding to the start scroll event; scrolling processing corresponding to the intermediate scroll event; and post-scrolling processing corresponding to the end scroll event.

Interaction events triggered by some interactive devices do not have clear start identifiers and end identifiers. The unified interaction framework may select some specific interaction events from such interaction events as a start interaction event or an end interaction event, or the unified interaction framework may fit some events at a specific moment as a start interaction event or an end interaction event. For example, a scroll event triggered by rotation of a watch crown of a smartwatch does not have a clear start identifier and a clear end identifier. The unified interaction framework may use, as a start scroll event, a scroll event detected for the first time after a scroll listener is started, and invoke, based on the start scroll event, a scroll widget to perform pre-scrolling processing. When the watch crown is stationary, no scroll event is triggered. In this case, the unified interaction framework may fit a scroll event when determining that the watch crown is stationary, use the scroll event as an end scroll event, and invoke, based on the end scroll event, the scroll widget to perform post-scrolling processing. The foregoing scroll widget does not need to sense a specific type of an interactive device, and a scroll widget applicable to mouse dragging is also applicable to watch crown rotation. The widget and the APP do not require secondary development. In addition, in this embodiment, an application scenario of the scroll widget is extended, and user experience is enhanced.

According to a second aspect, this application provides an apparatus for processing an interaction event. The apparatus includes units configured to perform the method according to the first aspect. The apparatus may be a terminal device or a chip in the terminal device. The apparatus may include an input unit and a processing unit. The processing unit may be a processor, and the input unit may be a communication interface. The terminal device may further include a storage unit, and the storage unit may be a memory. The storage unit is configured to store instructions, and the processing unit executes the instructions stored in the storage unit, so that the terminal device performs the method according to the first aspect.

According to a third aspect, this application provides a computer-readable storage medium. The computer-readable storage medium stores a computer program. When the computer program is executed by a processor, the processor is enabled to perform the method according to the first aspect.

According to a fourth aspect, this application provides a computer program product. The computer program product includes computer program code. When the computer program code is run by a processor, the processor is enabled to perform the method according to the first aspect.

DETAILED DESCRIPTION OF ILLUSTRATIVE EMBODIMENTS

The following describes technical solutions in embodiments of this application with reference to accompanying drawings.

Figure 1:
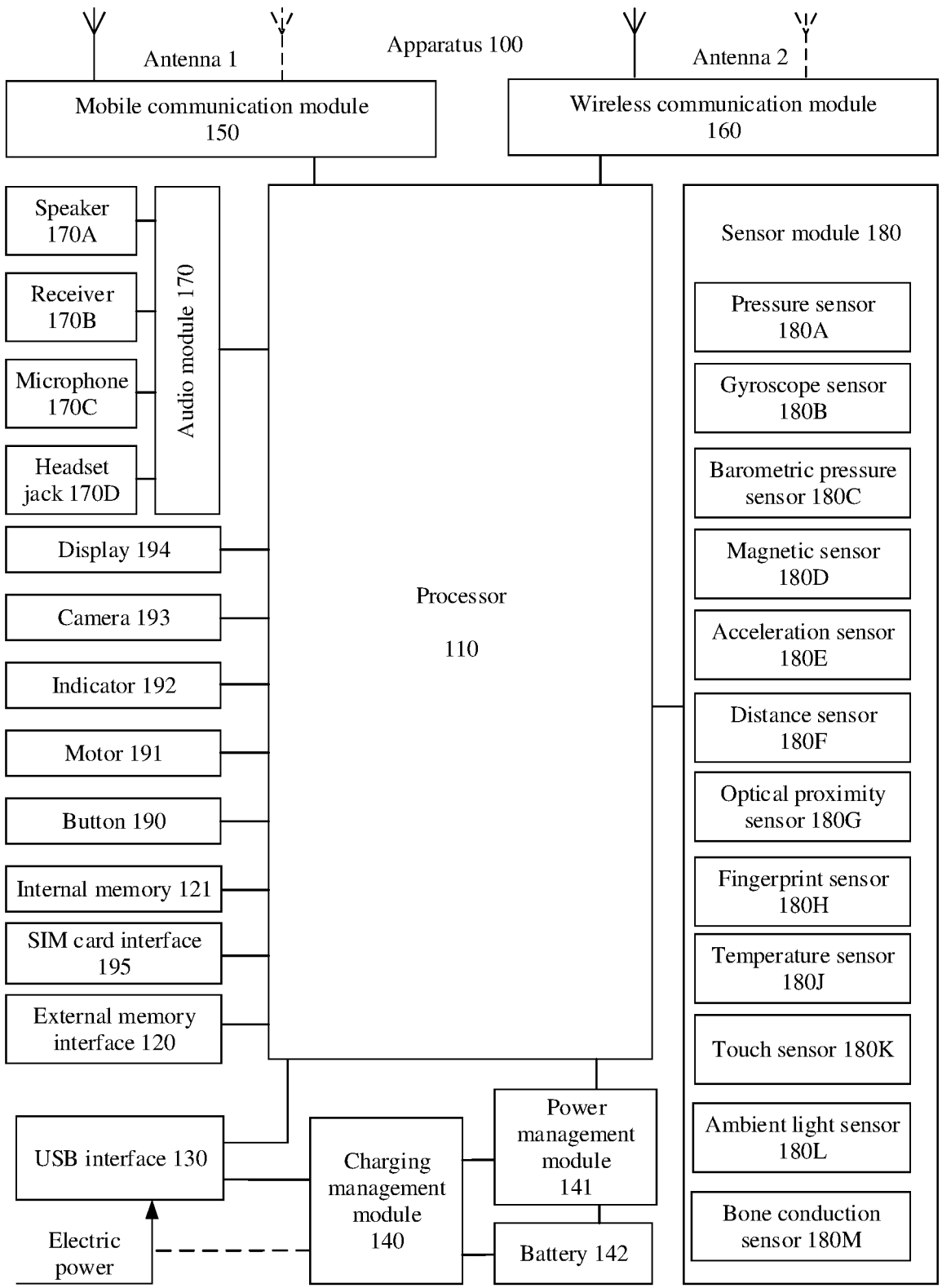
FIG. 1 is a schematic diagram of a hardware structure of an apparatus for processing an interaction task according to an embodiment of this application.

FIG. 1 shows a hardware structure of an apparatus applicable to this application. The apparatus may be configured to process an interaction event.

As shown in FIG. 1, the apparatus 100 may be a mobile phone, a smart screen, a tablet computer, a wearable electronic device, a vehicle-mounted electronic device, an augmented reality (AR) device, a virtual reality (VR) device, a notebook computer, an ultra-mobile personal computer (UMPC), a netbook, a personal digital assistant (PDA), a projector, or the like. A specific type of the apparatus 100 is not limited in this embodiment of this application.

The apparatus 100 may include a processor 110, an external memory interface 120, an internal memory 121, a universal serial bus (USB) interface 130, a charging management module 140, a power management module 141, a battery 142, an antenna 1, an antenna 2, a mobile communication module 150, a wireless communication module 160, an audio module 170, a speaker 170A, a receiver 170B, a microphone 170C, a headset jack 170D, a sensor module 180, a button 190, a motor 191, an indicator 192, a camera 193, a display 194, a subscriber identification module (SIM) card interface 195, and the like. The sensor module 180 may include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, an ambient light sensor 180L, a bone conduction sensor 180M, and the like.

It should be noted that the structure shown in FIG. 1 does not constitute a specific limitation on the apparatus 100. In some other embodiments of this application, the apparatus 100 may include more or fewer components than those shown in FIG. 1, or the apparatus 100 may include a combination of some of the components shown in FIG. 1, or the apparatus 100 may include subcomponents of some of the components shown in FIG. 1. The components shown in FIG. 1 may be implemented by using hardware, software, or a combination of software and hardware.

The processor 110 may include one or more processing units. For example, the processor 110 may include at least one of the following processing units: an application processor (AP), a modem processor, a graphics processing unit (GPU), an image signal processor (ISP), a controller, a video codec, a digital signal processor (DSP), a baseband processor, or a neural network processor (neural-network processing unit, NPU). Different processing units may be independent components, or may be an integrated component.

The controller may generate an operation control signal based on an instruction operation code and a time sequence signal, to complete control of instruction fetching and instruction execution.

A memory may be further disposed in the processor 110, and is configured to store instructions and data. In some embodiments, the memory in the processor 110 is a cache. The memory may store instructions or data that has just been used or is cyclically used by the processor 110. If the processor 110 needs to use the instructions or the data again, the processor 110 may directly invoke the instructions or the data from the memory. This avoids repeated access, reduces waiting time of the processor 110, and improves system efficiency.

In some embodiments, the processor 110 may include one or more interfaces. For example, the processor 110 may include at least one of the following interfaces: an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a SIM interface, and a USB interface.

The I2C interface is a two-way synchronization serial bus, and includes one serial data line (SDA) and one serial clock line (SCL). In some embodiments, the processor 110 may include a plurality of groups of I2C buses. The processor 110 may be separately coupled to the touch sensor 180K, a charger, a flash, the camera 193, and the like through different I2C bus interfaces. For example, the processor 110 may be coupled to the touch sensor 180K through the I2C interface, so that the processor 110 communicates with the touch sensor 180K through the I2C bus interface, to implement a touch function of the apparatus 100.

The I2S interface may be used for audio communication. In some embodiments, the processor 110 may include a plurality of groups of I2S buses. The processor 110 may be coupled to the audio module 170 through the I2S bus, to implement communication between the processor 110 and the audio module 170. In some embodiments, the audio module 170 may transmit an audio signal to the wireless communication module 160 through the I2S interface, to implement a function of answering a call through a Bluetooth headset.

The PCM interface may also be used for audio communication, and implement analog signal sampling, quantization, and coding. In some embodiments, the audio module 170 may be coupled to the wireless communication module 160 through a PCM bus interface. In some embodiments, the audio module 170 may alternatively transmit an audio signal to the wireless communication module 160 through the PCM interface, to implement a function of answering a call through a Bluetooth headset. Both the I2S interface and the PCM interface may be used for audio communication.

The UART interface is a universal serial data bus, and is used for asynchronous communication. The bus may be a two-way communication bus. The bus converts to-be-transmitted data between serial communication and parallel communication. In some embodiments, the UART interface is usually configured to connect the processor 110 to the wireless communication module 160. For example, the processor 110 communicates with a Bluetooth module in the wireless communication module 160 through the UART interface, to implement a Bluetooth function. In some embodiments, the audio module 170 may transmit an audio signal to the wireless communication module 160 through the UART interface, to implement a function of playing music through a Bluetooth headset.

The MIPI interface may be configured to connect the processor 110 to a peripheral component such as the display 194 or the camera 193. The MIPI interface includes a camera serial interface (CSI), a display serial interface (DSI), and the like. In some embodiments, the processor 110 communicates with the camera 193 through a CSI interface, to implement a photographing function of the apparatus 100. The processor 110 communicates with the display 194 through a DSI interface, to implement a display function of the apparatus 100.

The GPIO interface may be configured by using software. The GPIO interface may be configured as a control signal interface, or may be configured as a data signal interface. In some embodiments, the GPIO interface may be configured to connect the processor 110 to the camera 193, the display 194, the wireless communication module 160, the audio module 170, and the sensor module 180. The GPIO interface may alternatively be configured as an I2C interface, an I2S interface, a UART interface, or an MIPI interface.

The USB interface 130 is an interface that complies with a USB standard specification, for example, may be a mini USB interface, a micro USB interface, or a USB type C interface. The USB interface 130 may be configured to connect to a charger to charge the apparatus 100, or may be configured to transmit data between the apparatus 100 and a peripheral device, or may be configured to connect to a headset to play audio through the headset. The USB interface 130 may be further configured to connect to another apparatus 100, for example, an AR device.

A connection relationship between the modules shown in FIG. 1 is merely an example for description, and does not constitute a limitation on the connection relationship between the modules of the apparatus 100. Optionally, the modules of the apparatus 100 may also use a combination of a plurality of connection manners in the foregoing embodiment.

The charging management module 140 is configured to receive power from a charger. The charger may be a wireless charger or a wired charger. In some embodiments of wired charging, the charging management module 140 may receive a current from a wired charger through the USB interface 130. In some embodiments of wireless charging, the charging management module 140 may receive an electromagnetic wave (where a current path is shown by a dashed line) through a wireless charging coil of the apparatus 100. When charging the battery 142, the charging management module 140 may further supply power to the apparatus 100 through the power management module 141.

The power management module 141 is configured to connect to the battery 142, the charging management module 140, and the processor 110. The power management module 141 receives an input from the battery 142 and/or the charging management module 140, and supplies power to the processor 110, the internal memory 121, the display 194, the camera 193, the wireless communication module 160, and the like. The power management module 141 may be further configured to monitor parameters such as a battery capacity, a battery cycle count, and a battery state of health (for example, electric leakage and impedance). Optionally, the power management module 141 may be disposed in the processor 110, or the power management module 141 and the charging management module 140 may be disposed in a same component.

A wireless communication function of the apparatus 100 may be implemented through components such as the antenna 1, the antenna 2, the mobile communication module 150, the wireless communication module 160, the modem processor, and the baseband processor.

The antenna 1 and the antenna 2 are configured to transmit and receive electromagnetic wave signals. Each antenna in the apparatus 100 may be configured to cover one or more communication frequency bands. Different antennas may be further multiplexed, to improve antenna utilization. For example, the antenna 1 may be multiplexed as a diversity antenna in a wireless local area network. In some other embodiments, the antenna may be used in combination with a tuning switch.

The mobile communication module 150 may provide a wireless communication solution applied to the apparatus 100, for example, at least one of the following solutions: a $2^{nd}$ generation (2G) mobile communication solution, a $3^{rd}$ generation (3G) mobile communication solution, a $4^{th}$ generation (4G) mobile communication solution, and a $5^{th}$ generation (5G) mobile communication solution. The mobile communication module 150 may include at least one filter, a switch, a power amplifier, a low noise amplifier (LNA), and the like. The mobile communication module 150 may receive an electromagnetic wave through the antenna 1, perform processing such as filtering and amplification on the received electromagnetic wave, and transmit the electromagnetic wave to the modem processor for demodulation. The mobile communication module 150 may further amplify a signal modulated by the modem processor, and the amplified signal is converted by the antenna 1 into an electromagnetic wave for radiation. In some embodiments, at least some functional modules of the mobile communication module 150 may be disposed in the processor 110. In some embodiments, at least some functional modules of the mobile communication module 150 may be disposed in a same component as at least some modules of the processor 110.

The modem processor may include a modulator and a demodulator. The modulator is configured to modulate a to-be-sent low-frequency baseband signal into a medium-high frequency signal. The demodulator is configured to demodulate a received electromagnetic wave signal into a low-frequency baseband signal. Then, the demodulator transmits the low-frequency baseband signal obtained through demodulation to the baseband processor for processing. The baseband processor processes the low-frequency baseband signal, and then transfers an obtained signal to the application processor. The application processor outputs a sound signal through an audio device (for example, the speaker 170A or the receiver 170B), or displays an image or a video through the display 194. In some embodiments, the modem processor may be an independent component. In some other embodiments, the modem processor may be independent of the processor 110, and is disposed in a same component as the mobile communication module 150 or another functional module.

Similar to the mobile communication module 150, the wireless communication module 160 may also provide a wireless communication solution applied to the apparatus 100, for example, at least one of the following solutions: wireless local area network (WLAN), Bluetooth (BT), global navigation satellite system (GNSS), frequency modulation (FM), near field communication (NFC), and infrared (IR). The wireless communication module 160 may be one or more components integrating at least one communication processing module. The wireless communication module 160 receives an electromagnetic wave through the antenna 2, performs frequency modulation and filtering processing on an electromagnetic wave signal, and sends a processed signal to the processor 110. The wireless communication module 160 may further receive a to-be-sent signal from the processor 110, perform frequency modulation and amplification on the signal, and convert the signal into an electromagnetic wave through the antenna 2 for radiation.

In some embodiments, the antenna 1 of the apparatus 100 is coupled to the mobile communication module 150, and the antenna 2 of the apparatus 100 is coupled to the wireless communication module 160.

The apparatus 100 may implement a display function through the GPU, the display 194, and the application processor. The GPU is a microprocessor for image processing, and is connected to the display 194 and the application processor. The GPU is configured to: perform mathematical and geometric calculation, and render an image. The processor 110 may include one or more GPUs that execute program instructions to generate or change display information.

The display 194 may be configured to display an image or a video. The display 194 includes a display panel. The display panel may be a liquid crystal display (LCD), an organic light-emitting diode (OLED), an active-matrix organic light-emitting diode (AMOLED), a flex light-emitting diode (FLED), a mini light-emitting diode (Mini LED), a micro light-emitting diode (Micro LED), a micro OLED, or quantum dot light emitting diodes (QLED). In some embodiments, the apparatus 100 may include one or N displays 194, where N is a positive integer greater than 1.

The apparatus 100 may implement a photographing function through the ISP, the camera 193, the video codec, the GPU, the display 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may perform algorithm optimization on noise, brightness, and color of an image, and the ISP may further optimize parameters such as exposure and color temperature of a photographing scenario. In some embodiments, the ISP may be disposed in the camera 193.

The camera 193 is configured to capture a static image or a video. An optical image of an object is generated through the lens, and is projected onto the photosensitive element. The photosensitive element may be a charge-coupled device (CCD) or a complementary metal-oxide-semiconductor (CMOS) phototransistor. The photosensitive element converts an optical signal into an electrical signal, and then transmits the electrical signal to the ISP for converting the electrical signal into a digital image signal. The ISP outputs the digital image signal to the DSP for processing. The DSP converts the digital image signal into an image signal in a standard format such as red green blue (RGB) or YUV. In some embodiments, the apparatus 100 may include one or N cameras 193, where N is a positive integer greater than 1.

The digital signal processor is configured to process a digital signal, and may process another digital signal in addition to the digital image signal. For example, when the apparatus 100 selects a frequency, the digital signal processor is configured to perform Fourier transform and the like on energy of the frequency.

The video codec is configured to compress or decompress a digital video. The apparatus 100 may support one or more video codecs. In this way, the apparatus 100 may play or record videos in a plurality of encoding formats, for example, moving picture experts group (MPEG) 1, MPEG2, MPEG3, and MPEG4.

The NPU is a processor that uses a biological neural network structure as a reference. For example, the NPU quickly processes input information with reference to a transfer mode between human brain neurons, and may further continuously perform self-learning. Functions such as intelligent cognition of the apparatus 100, for example, image identification, facial identification, speech identification, and text understanding, may be implemented through the NPU.

The external memory interface 120 may be configured to connect to an external memory card, for example, a secure digital (SD) card, to expand a storage capability of the apparatus 100. The external storage card communicates with the processor 110 through the external memory interface 120, to implement a data storage function. For example, files such as music and a video are stored in the external storage card.

The internal memory 121 may be configured to store computer-executable program code. The executable program code includes instructions. The internal memory 121 may include a program storage area and a data storage area. The program storage area may store an operating system and an application required by at least one function (for example, a sound playing function and an image playing function). The data storage area may store data (for example, audio data and a phone book) created during use of the apparatus 100. In addition, the internal memory 121 may include a high-speed random access memory, and may further include a nonvolatile memory, for example, at least one magnetic disk storage component, a flash memory component, or a universal flash storage (UFS). The processor 110 runs instructions stored in the internal memory 121 and/or instructions stored in the memory disposed in the processor, to perform various function applications and data processing of the apparatus 100.

The apparatus 100 may implement an audio function, for example, music playing and recording, through the audio module 170, the speaker 170A, the receiver 170B, the microphone 170C, the headset jack 170D, the application processor, and the like.

The audio module 170 is configured to convert digital audio information into an analog audio signal output, and may also be configured to convert an analog audio input into a digital audio signal. The audio module 170 may be further configured to code and decode an audio signal. In some embodiments, the audio module 170 or some functional modules of the audio module 170 may be disposed in the processor 110.

The speaker 170A, also referred to as a loudspeaker, is configured to convert an electrical audio signal into a sound signal. The apparatus 100 may be used to listen to music or make a hands-free call through the speaker 170A.

The receiver 170B, also referred to as an earpiece, is configured to convert an electrical audio signal into a sound signal. When a user uses the apparatus 100 to answer a call or receive voice information, the user may receive a voice by placing the receiver 170B close to an ear.

The microphone 170C, also referred to as a mike or a mic, is configured to convert a sound signal into an electrical signal. When making a call or sending voice information, the user may place the mouth near the microphone 170C to make a sound, to input a sound signal to the microphone 170C. At least one microphone 170C may be disposed in the apparatus 100. In some other embodiments, two microphones 170C may be disposed in the apparatus 100, to implement a noise reduction function. In some other embodiments, three, four, or more microphones 170C may be further disposed in the apparatus 100, to implement functions such as sound source identification and directional recording.

The headset jack 170D is configured to connect to a wired headset. The headset jack 170D may be the USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some embodiments, the pressure sensor 180A may be disposed on the display 194. There are a plurality of types of pressure sensors 180A, such as a resistive pressure sensor, an inductive pressure sensor, and a capacitive pressure sensor. The capacitive pressure sensor may include at least two parallel plates with conductive materials. When a force is applied to the pressure sensor 180A, a capacitance between electrodes changes, and the apparatus 100 determines intensity of pressure based on a change of the capacitance. When a touch operation is performed on the display 194, the apparatus 100 detects the touch operation based on the pressure sensor 180A. The apparatus 100 may also calculate a touch location based on a detection signal of the pressure sensor 180A. In some embodiments, touch operations that are performed at a same touch location but have different touch operation strength may correspond to different operation instructions. For example, when a touch operation whose touch operation strength is less than a first pressure threshold is performed on a short message service message application icon, an instruction for viewing a short message service message is executed; when a touch operation whose touch operation strength is greater than or equal to the first pressure threshold is performed on the short message service message application icon, an instruction for newly creating a short message service message is executed.

The gyroscope sensor 180B may be configured to determine a motion posture of the apparatus 100. In some embodiments, angular velocities of the apparatus 100 around three axes (for example, an x-axis, a y-axis, and a z-axis) may be determined through the gyroscope sensor 180B. The gyroscope sensor 180B may be configured to implement image stabilization during photographing. For example, when the shutter is pressed, the gyroscope sensor 180B detects an angle at which the apparatus 100 shakes, and calculates, based on the angle, a distance that needs to be compensated by a lens module, so that a lens cancels shaking of the apparatus 100 through reverse motion, to implement image stabilization. The gyroscope sensor 180B may also be used in scenarios such as navigation and motion sensing gaming.

The barometric pressure sensor 180C is configured to measure barometric pressure. In some embodiments, the apparatus 100 calculates an altitude based on a value of the barometric pressure measured by the barometric pressure sensor 180C, to assist in positioning and navigation.

The magnetic sensor 180D includes a Hall sensor. The apparatus 100 may detect opening and closing of a flip leather case through the magnetic sensor 180D. In some embodiments, when the apparatus 100 is a flip phone, the apparatus 100 may detect opening and closing of a flip cover through the magnetic sensor 180D. The apparatus 100 may set features such as automatic unlocking through flipping based on a detected opening/closing state of the leather case or the flip cover.

The acceleration sensor 180E may detect magnitudes of accelerations of the apparatus 100 in various directions (generally along the x-axis, the y-axis, and the z-axis). When the apparatus 100 is stationary, a magnitude and a direction of gravity may be detected. The acceleration sensor 180E may be further configured to identify a posture of the apparatus 100, and use the posture as an input parameter of applications such as landscape/portrait orientation switching and a pedometer.

The distance sensor 180F is configured to measure a distance. The apparatus 100 may measure the distance by using infrared or lasers. In some embodiments, for example, in a photographing scenario, the apparatus 100 may use the distance sensor 180F to measure a distance to implement fast focusing.

The optical proximity sensor 180G may include, for example, a light-emitting diode (LED) and an optical detector, for example, a photodiode. The LED may be an infrared LED. The apparatus 100 emits infrared light to the outside through the LED. The apparatus 100 uses the photodiode to detect infrared reflected light from a nearby object. When reflected light is detected, the apparatus 100 may determine that there is an object nearby. When no reflected light is detected, the apparatus 100 may determine that there is no object nearby. The apparatus 100 may detect, through the optical proximity sensor 180G, whether the user holds the apparatus 100 close to an ear to make a call, to automatically turn off a screen to save power. The optical proximity sensor 180G may also be used in a leather case mode or a pocket mode to automatically unlock or lock the screen.

The ambient light sensor 180L is configured to sense ambient light brightness. The apparatus 100 may adaptively adjust brightness of the display 194 based on the sensed ambient light brightness. The ambient light sensor 180L may also be configured to automatically adjust a white balance during photographing. The ambient light sensor 180L may further cooperate with the optical proximity sensor 180G to detect whether the apparatus 100 is in a pocket, to implement mistouch prevention.

The fingerprint sensor 180H is configured to collect a fingerprint. The apparatus 100 may implement functions such as unlocking, accessing an application lock, photographing, and answering a call by using a collected fingerprint feature.

The temperature sensor 180J is configured to detect a temperature. In some embodiments, the apparatus 100 executes a temperature processing policy based on the temperature detected by the temperature sensor 18J. For example, when the temperature reported by the temperature sensor 180J exceeds a threshold, the apparatus 100 lowers performance of a processor near the temperature sensor 180J, to reduce power consumption and implement thermal protection. In some other embodiments, when the temperature is less than another threshold, the apparatus 100 heats the battery 142, to avoid abnormal shutdown of the apparatus 100 caused by a low temperature. In some other embodiments, when the temperature is less than still another threshold, the apparatus 100 boosts an output voltage of the battery 142, to avoid abnormal shutdown caused by a low temperature.

The touch sensor 180K is also referred to as a touch component. The touch sensor 180K may be disposed on the display 194, and the touch sensor 180K and the display 194 form a touchscreen. The touchscreen is also referred to as a touch panel. The touch sensor 180K is configured to detect a touch operation performed on or near the touch sensor. The touch sensor 180K may transfer the detected touch operation to the application processor to determine a touch event type. A visual output related to the touch operation may be provided through the display 194. In some other embodiments, the touch sensor 180K may also be disposed on a surface of the apparatus 100, and is disposed at a location different from that of the display 194.

The bone conduction sensor 180M may obtain a vibration signal. In some embodiments, the bone conduction sensor 180M may obtain a vibration signal of a vibration bone of a human vocal-cord part. The bone conduction sensor 180M may also be in contact with a human pulse, and receive a blood pressure beating signal. In some embodiments, the bone conduction sensor 180M may alternatively be disposed in the headset, to constitute a bone conduction headset. The audio module 170 may obtain a voice signal through parsing based on the vibration signal that is of the vibration bone of the vocal-cord part and that is obtained by the bone conduction sensor 180M, to implement a voice function. The application processor may parse heart rate information based on the blood pressure beating signal obtained by the bone conduction sensor 180M, to implement a heart rate detection function.

The button 190 includes a power button and a volume button. The button 190 may be a mechanical button, or may be a touch button. The apparatus 100 may receive a button input signal, to implement a function related to the button input signal.

The motor 191 may generate vibration. The motor 191 may be used for incoming call prompting, or may be used for touch feedback. The motor 191 may generate different vibration feedback effects for touch operations performed on different applications. For touch operations performed on different areas of the display 194, the motor 191 may also generate different vibration feedback effects. Different application scenarios (for example, time reminding, information receiving, an alarm clock, and a game) may correspond to different vibration feedback effects. A touch vibration feedback effect may be further customized.

The indicator 192 may be an indicator light, and may be configured to indicate a charging state and a power change, or may be configured to indicate a message, a missed call, and a notification.

The SIM card interface 195 is configured to connect to a SIM card. The SIM card may be inserted into the SIM card interface 195 to implement contact with the apparatus 100, or may be removed from the SIM card interface 195 to implement separation from the apparatus 100. The apparatus 100 may support one or N SIM card interfaces, where N is a positive integer greater than 1. A plurality of cards may be inserted into a same SIM card interface 195 at the same time, and types of the plurality of cards may be the same or different. The SIM card interface 195 is also compatible with an external storage card. The apparatus 100 interacts with a network through the SIM card, to implement functions such as a call and data communication. In some embodiments, the apparatus 100 uses an embedded-SIM (eSIM) card, and the eSIM card may be embedded in the apparatus 100 and cannot be separated from the apparatus 100.

The foregoing describes in detail the hardware system of the apparatus 100 for processing an interaction event. The following describes a software system of the apparatus 100 for processing an interaction event provided in embodiments of this application. The software system may use a layered architecture, an event-driven architecture, a microkernel architecture, a microservice architecture, or a cloud architecture. In embodiments of this application, the layered architecture is used as an example to describe the software system of the apparatus 100 for processing an interaction event.

Figure 2:
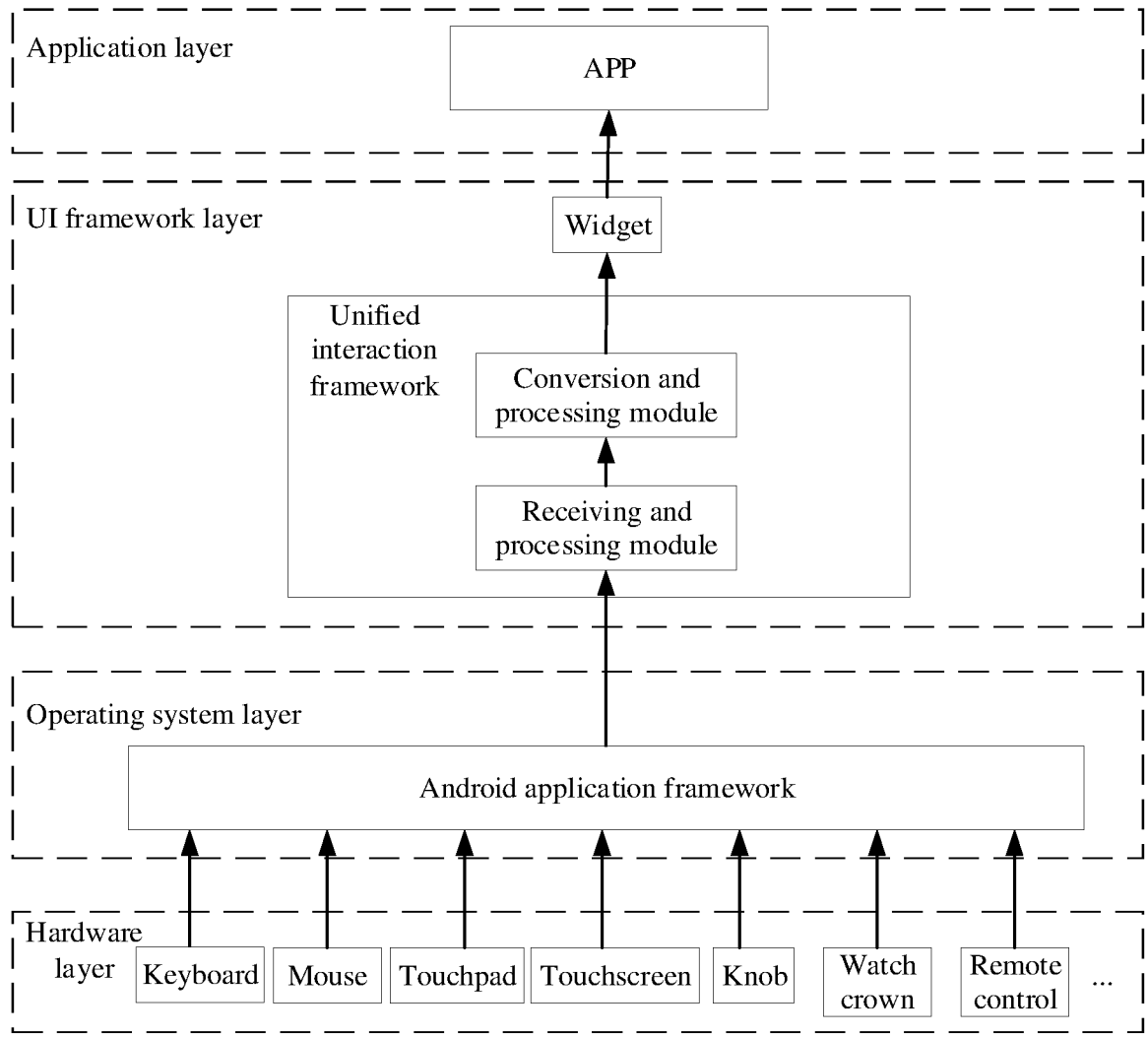
FIG. 2 is a schematic diagram of a structure of a software system for processing an interaction task according to an embodiment of this application.

As shown in FIG. 2, the layered architecture divides the software system into several layers. Each layer has a clear role and responsibility. The layers communicate with each other through a software interface. In some embodiments, the software system is divided into three layers: an application layer, a UI framework layer, and an operating system layer from top to bottom.

The application layer may include applications such as Camera, Gallery, Calendar, Phone, Maps, Navigation, WLAN, Bluetooth, Music, Videos, and Messages.

The UI framework layer includes a unified interaction framework and a widget. A receiving and processing module of the unified interaction framework is configured to identify a type and a behavior of an interaction event. A conversion and processing module of the unified interaction framework is configured to normalize a behavior parameter and validate the behavior parameter on the widget. The widget can integrate functions of the unified interaction framework and interact with an APP through an API.

The operating system layer includes an Android application programming framework. The Android application framework obtains the interaction event from a hardware layer, and transmits the interaction event to the unified interaction framework.

For example, when a user performs a touch operation on the touch sensor 180K, a corresponding hardware interrupt is sent to the operating system layer, and the operating system layer processes the touch operation into an interaction event, where the interaction event includes, for example, information such as touch coordinates and a timestamp of the touch operation. Then, the operating system layer identifies a widget corresponding to the interaction event, and notifies the widget of a corresponding APP. When the touch operation is a tap operation and the widget is a widget of the camera APP, the widget of the camera APP invokes a camera driver through an API based on the interaction event, to control the camera 193 to perform photographing.

The software system shown in FIG. 2 is an example of a software system applicable to this application, and other software systems (such as an iOS® system and a Windows® system) having an event-driven mechanism are all applicable to this application.

Based on the foregoing descriptions about the hardware architecture and the software architecture, the following describes a method for processing an interaction event provided in this application. The method for processing an interaction event is applicable to the foregoing hardware architecture and software architecture, and the software architecture shown in FIG. 2 is carried on the hardware structure shown in FIG. 1. The apparatus 100 may perform all or some steps of the method for processing an interaction event.

Figure 3:
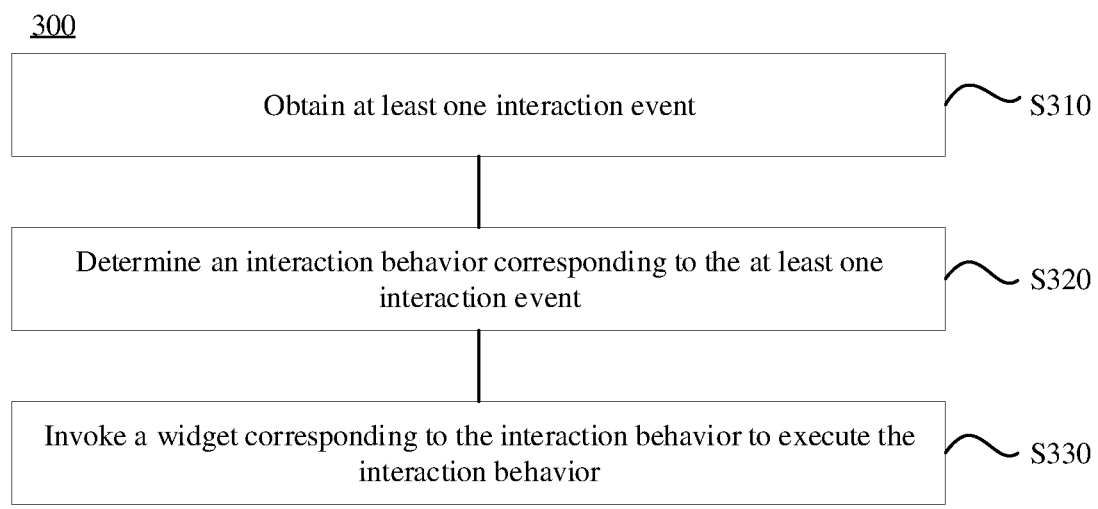
FIG. 3 is a schematic diagram of a method for processing an interaction task according to an embodiment of this application.

The following describes a method for processing an interaction event provided in this application. As shown in FIG. 3, the method 300 includes the following steps.

S310: Obtain at least one interaction event.

The at least one interaction event may be one interaction event, or may be a plurality of interaction events. For example, the at least one interaction event may be an interaction event triggered by a user by tapping a touchpad, or may be two interaction events triggered by the user by using a keyboard and a mouse. Specific content of the interaction event and a manner of triggering the interaction event are not limited in this application.

The at least one interaction event may be triggered by an interactive device. In this case, a unified interaction framework may obtain the at least one interaction event from an Android application framework. Alternatively, the at least one interaction event may be fitted by the unified interaction framework. A manner of obtaining the at least one interaction event is not limited in this application.

Interaction events may be classified into a key event (KeyEvent) and a motion event (MotionEvent) based on types of interactive devices. For example, interaction events triggered by interactive devices such as the keyboard, a knob, and a remote control are key events, and interaction events triggered by interactive devices such as the mouse, the touchpad, and a watch crown of a smartwatch are motion events.

Different interaction events may include different information. Examples are provided below.

An interaction event triggered by a click on the mouse or a tap on the touchpad includes an event source, an event type, and coordinates.

An interaction event triggered by the watch crown includes an event source, an event type, and an event value.

An interaction event triggered by scrolling a mouse scroll wheel or sliding on the touchpad includes an event source, an event type, coordinates, and an event value.

An interaction event triggered by the keyboard, the knob, or the remote control includes an event source, an event type, and a key code.

In the information included in the foregoing interaction event, the event source indicates a type of an interactive device, the event type is, for example, pressing, lifting, moving, or scrolling, and the event value is, for example, an operation amplitude value corresponding to a motion event. Different interaction events may be distinguished by using event sources, event types, and key codes. The interaction event may further include other information. Specific content of the information included in the interaction event is not limited in this application.

Optionally, interaction events may alternatively be classified into a valueless event and a valued event based on whether the interaction events include event values. In other words, the event type may further include the valued event and the valueless event. An interaction operation is an operation such as clicking, dragging, or moving performed by the user by using the interactive device.

For example, the keyboard usually can type only fixed characters, the knob usually has only an on/off function, and the remote control usually can output only a fixed instruction. There is no selection for interaction operations of the three interactive devices. Therefore, the interaction events triggered by the keyboard, the knob, and the remote control are valueless events.

For another example, the user may perform drag operations with different distances by using the mouse, the touchpad, and a touchscreen, and the user may rotate the watch crown by different angles when controlling rotation of the watch crown. There is an optional operation amplitude for interaction operations of these interactive devices. Therefore, the interaction event triggered by the mouse, the touchpad, the touchscreen, or the watch crown is a valued event.

After obtaining the at least one interaction event, the unified interaction framework may perform the following step.

S320: Determine an interaction behavior corresponding to the at least one interaction event.

There is an association relationship between an interaction event and an interaction behavior, and the interaction behavior may be a feedback provided by a widget for an interaction operation. For example, an interaction behavior triggered by the user by tapping the touchpad may be object selection, where tapping is an example of the interaction operation, and the object selection is an example of the interaction behavior. Table 1 shows a correspondence between some interaction operations and some interaction behaviors provided in this application.

TABLE 1

| | Interaction operation | | | | | | | |
|---|---|---|---|---|---|---|---|---|
| | Mobile phone/Tablet | Tablet/Personal computer | | | Smart television | | Head unit | Smartwatch |
| Interaction behavior | Touchscreen | Mouse | Touchpad | Keyboard | Remote control | Air gesture | Knob/ Joystick | Watch crown |
| Focus switching | \ | \ | \ | Move the focus by using arrow keys | Slide to a widget with one finger | Move the focus to a widget by using a specific gesture | Move the focus by using the knob/ joystick | Switch the focus by scrolling the watch crown |
| Hovering state | \ | Move the cursor to a widget | Slide to a widget with one finger | \ | \ | \ | \ | \ |
| Object opening | Tap with one finger | Double-click the left button | Tap with one finger | Move the focus + press Enter | Move the focus to an object and | Move the focus by using a | Move the focus + press Enter | Press the watch crown |

TABLE 1-continued

| | Interaction operation | | | | | | | |
|---|---|---|---|---|---|---|---|---|
| | Mobile phone/Tablet | Tablet/Personal computer | | | Smart television | | Head unit | Smartwatch |
| Interaction behavior | Touchscreen | Mouse | Touchpad | Keyboard | Remote control | Air gesture | Knob/ Joystick | Watch crown |
| State switching/ Single object selection | Tap with one finger | Click the left button | Tap with one finger | | open the object | specific gesture and open with a specific gesture | | |
| Scrolling/ Sliding | Slide with one finger | Scroll wheel | Slide with two fingers | Arrow keys | Slide with one finger | Specific gesture | Knob/ Joystick (single move) | Scroll the watch crown |
| Progress adjustment | Slide with one finger | Scroll wheel | Slide with two fingers | Arrow keys | Slide with one finger; arrow keys | Specific gesture | Knob | Scroll the watch crown |
| Page turning | Tap to turn pages; slide with one finger | Scroll wheel | Slide with two fingers | Arrow keys; key combination Ctrl + Tab | Slide with one finger; arrow keys | Specific gesture | Knob | Scroll the watch crown |
| Menu display | Touch and hold | Right button | Tap with two fingers | \ | Press and hold | \ | \ | \ |
| Mode switching | Touch and hold | Click and hold the left button; Ctrl + left mouse button | Touch and hold; Ctrl + one-finger tap | (Ctrl + left mouse button) | Press and hold Enter | \ | Press and hold Enter | Press and hold the watch crown |
| Quick selection | Slide with one finger | Click the left button in the blank area, and drag to perform selection; Shift + left click | Press with one finger and slide to perform selection | (Shift + left click) | \ | \ | Shortcut keys | \ |
| Object dragging | Touch and hold an object and slide | Click the left button to hold an object and drag | Press with one finger and slide | \ | Press and hold an object and slide | \ | \ | \ |
| Content update | Slide down with one finger | Scroll wheel | Slide with two fingers | Shortcut keys | \ | \ | Knob | Scroll the watch crown |
| Object zooming | Pinch with two fingers; double-tap with one finger | Ctrl + scroll wheel; double-click the left button | Pinch with two fingers; double-tap with one finger | Ctrl++/−; Ctrl + W/S | \ | \ | Knob | \ |
| Object rotation | Rotate with two fingers | \ | Rotate with two fingers | \ | \ | \ | \ | \ |

In Table 1, content in the first column from the left is an interaction behavior, and content in each of the other columns is an interaction operation, of each interactive device, corresponding to the interaction behavior, where "\" indicates that the interactive device does not have an interaction operation corresponding to the interaction behavior. The touchpad may support a conventional keyboard and a multi-touch keyboard, for example, a Magic Keyboard®.

One interaction event may correspond to one interaction behavior. For example, two-finger tapping may correspond to menu displaying. One interaction event may alternatively correspond to a plurality of interaction behaviors. For example, mouse scroll wheel scrolling may correspond to progress adjustment and page turning. The unified interaction framework may determine, based on an interaction behavior registered by a widget, whether the mouse scroll wheel scrolling corresponds to the progress adjustment or the page turning.

A plurality of interaction events may correspond to a plurality of interaction behaviors, or may correspond to one interaction behavior. For example, the at least one interaction event obtained by the unified interaction framework includes a Menu event and a mouse scroll wheel scroll event. The unified interaction framework may determine that interaction behaviors corresponding to the two interaction events are menu triggering and page turning, or the unified interaction framework may determine that an interaction behavior corresponding to the two interaction events is image zooming. If the widget registers a combined interaction behavior, after obtaining a plurality of interaction events, the unified interaction framework may determine that the plurality of interaction events correspond to one interaction behavior (that is, the combined interaction behavior). If the widget does not register a combined interaction behavior, after obtaining a plurality of interaction events, the unified interaction framework separately processes the plurality of interaction events, and determines a plurality of corresponding interaction behaviors.

The unified interaction framework may use processing classes such as HwKeyEventDetector or HwGenericEventDetector to parse and process a single interaction event, or may use a combined processing class HwCompoundEventDetector to parse and process a plurality of interaction events.

Figure 4:
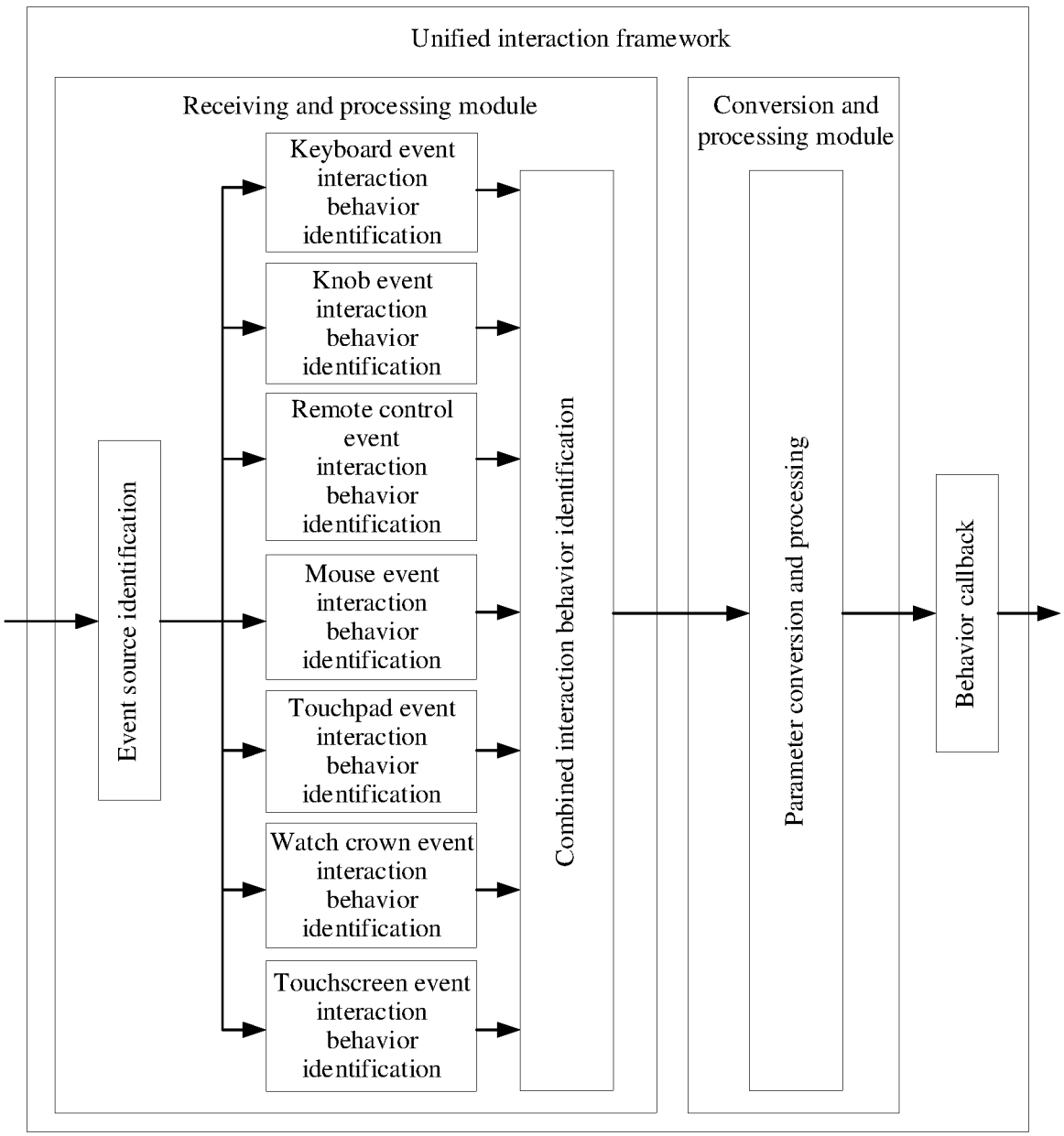
FIG. 4 is a schematic diagram of a method for processing an interaction event by a unified interaction framework according to an embodiment of this application.

FIG. 4 is a schematic diagram of a method for processing an interaction event by the unified interaction framework according to this application.

After obtaining the interaction event, a receiving and processing module first identifies an event source, and determines an interactive device corresponding to the interaction event, to perform differentiated processing on interaction events based on different interactive devices. Subsequently, the receiving and processing module determines, based on an interaction behavior supported by a widget, an interaction behavior corresponding to the interaction event. The receiving and processing module may determine, based on preset information (for example, an interaction behavior registered by the widget in advance), the interaction behavior supported by the widget. If the receiving and processing module obtains a plurality of interaction events, an interaction behavior corresponding to the plurality of interaction events in a combination case may be determined.

For example, after obtaining an interaction event, the receiving and processing module parses the interaction event through HwKeyEventDetector or HwGenericEventDetector, to obtain information included in the interaction event. If an event source of the interaction event indicates that an interactive device corresponding to the interaction event is a mouse, the receiving and processing module may determine, based on an interaction behavior registered by a mouse-related widget, an interaction behavior corresponding to the interaction event. One widget may register one or more interaction behaviors. Generally, interaction events corresponding to a plurality of interaction behaviors are different from each other, so that the receiving and processing module can determine a unique corresponding interaction behavior based on the at least one interaction event.

For another example, after obtaining two interaction events (a keyboard event and a mouse event), the receiving and processing module determines, through HwCompoundEventDetector, that the receiving and processing module needs to focus on a combined interaction behavior of a plurality of interaction events. In this case, the receiving and processing module may parse the two interaction events. In this embodiment, when the keyboard event is a Ctrl key event and the mouse event is a scroll wheel event, a combined interaction behavior corresponding to the two interaction events may be object zooming.

Some interaction events have event values. In this case, the unified interaction framework may generate, based on the event values of these interaction events, behavior parameters corresponding to the event values, and send the behavior parameters to widgets.

For example, after the receiving and processing module determines the interaction behavior corresponding to the interaction event, if the interaction event includes an event value, a conversion and processing module may generate a behavior parameter based on the event value, that is, perform parameter conversion and processing. The behavior parameter may include a behavior amplitude value, and the behavior amplitude value is positively correlated to the event value of the interaction event. For example, if an event type of the interaction event is a motion event triggered by the touchpad, the event value is an amplitude value corresponding to the motion event, and the amplitude value can indicate a sliding distance of a finger of the user on the touchpad. The conversion and processing module determines a sliding length value of a progress bar based on the amplitude value corresponding to the motion event, where the sliding length value of the progress bar is a behavior amplitude value. After obtaining the behavior amplitude value, a widget can control, based on the behavior amplitude value, the progress bar to perform normalization interaction, to enhance user experience.

The widget may be installed on different interactive devices. Because UI sizes of different interactive devices differ greatly, the unified interaction framework may perform differentiated processing on event values of the different interactive devices, to determine amplitude values that match the UI sizes of the interactive devices. The conversion and processing module may determine a transform coefficient corresponding to the interactive device, and determine the behavior amplitude value based on the transform coefficient and the event value. The behavior amplitude value is positively correlated to the event value of the interaction event, and the behavior amplitude value is positively correlated to the transform coefficient.

For example, when a finger of the user slides a same distance on touchscreens, if the widget is installed on the smartwatch, a sliding length value of a progress bar determined by the conversion and processing module based on a transform coefficient C1 is L1; if the widget is installed on the mobile phone, a sliding length value of a progress bar determined by the conversion and processing module based on a transform coefficient C2 is L2; if the widget is installed on the smart television, a sliding length value of a progress bar determined by the conversion and processing module based on a transform coefficient C3 is L3, where C1<C2<C3 and L1<L2<L3, in other words, the behavior amplitude value is positively correlated to the transform coefficient. In this embodiment, a UI size of the smartwatch is the smallest, so that a sliding distance of the progress bar is also the shortest; and a UI size of the smart television is the largest, so that a sliding distance of the progress bar is also the longest. Therefore, that the conversion and processing module determines the behavior amplitude value based on the transform coefficient related to the interactive device enables a behavior amplitude to match a UI size, so that user experience is enhanced.

After the interaction behavior corresponding to the interaction event is determined, the unified interaction framework may perform the following step.

S330: Invoke the widget corresponding to the interaction behavior to execute the interaction behavior.

Figure 5:
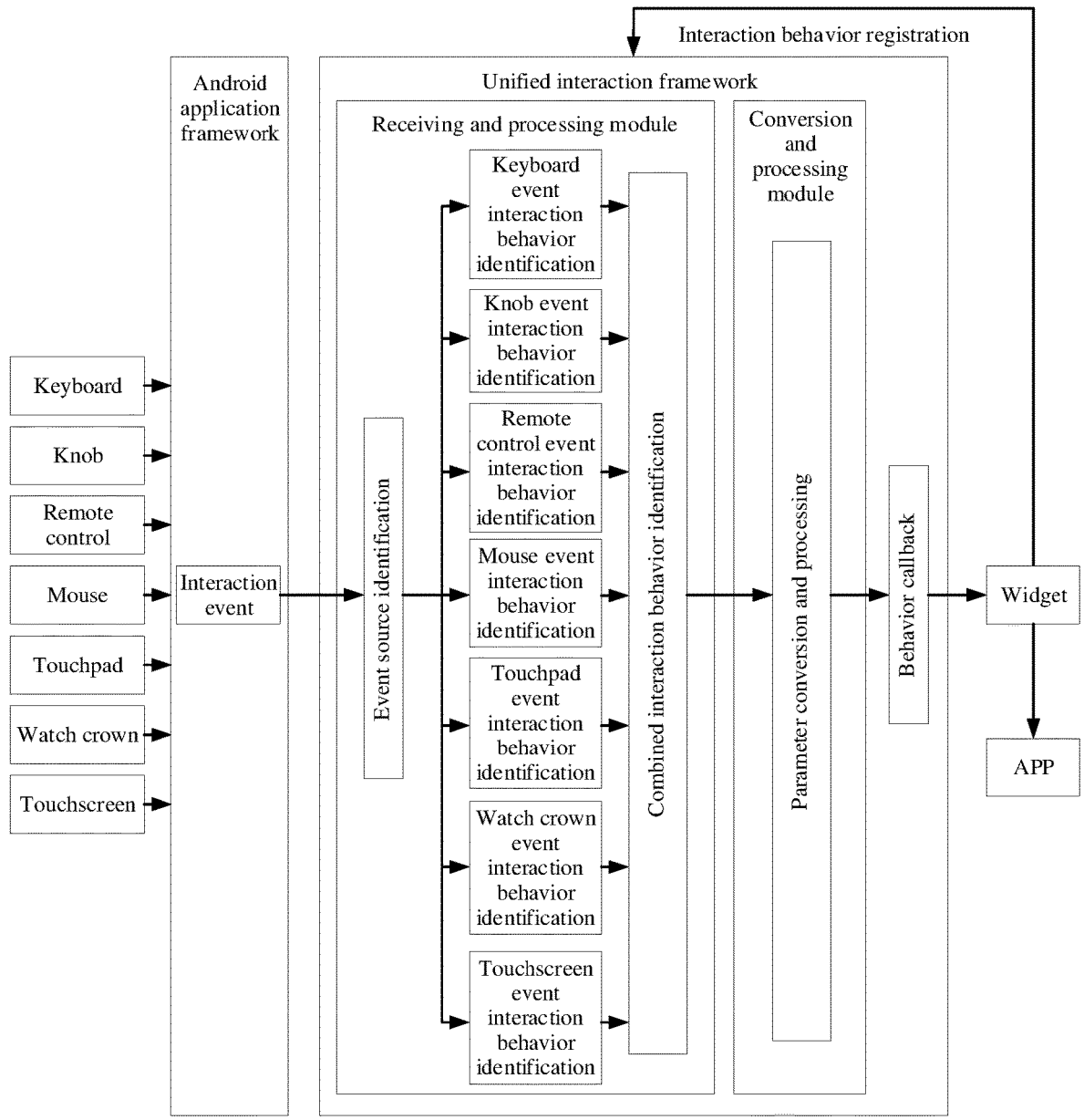
FIG. 5 is a schematic diagram of another method for processing an interaction event by a unified interaction framework according to an embodiment of this application.

FIG. 5 is a schematic diagram of interaction between the unified interaction framework and the widget.

After obtaining the at least one interaction event, the Android application framework transmits the at least one interaction event to the unified interaction framework.

The unified interaction framework performs event source identification on the at least one interaction event, determines the interactive device corresponding to the at least one interaction event, then further identifies the interaction behavior corresponding to the at least one interaction event, and determines, based on an interaction behavior registered by a widget in advance, the widget corresponding to the at least one interaction behavior. For some interaction events with event values, the unified interaction framework may further perform parameter conversion on the event values, and convert the event values into behavior amplitude values.

Subsequently, the unified interaction framework may execute, based on an interaction behavior callback widget registered by the widget in advance, the interaction behavior corresponding to the at least one interaction event. Optionally, the behavior amplitude value may be further sent to the widget.

After receiving a behavior callback instruction, the widget responds to the behavior. The widget may invoke an APP through an API to cooperate to complete the interaction behavior, for example, refresh application data.

For example, for a progress bar widget, the progress bar widget does not need to know peripheral devices, and only needs to register a behavior supported by the progress bar widget with the unified interaction framework (setOnChangeProgressListener). The unified interaction framework can start identification of interaction events of seven interactive devices (such as a left and right arrow key event of the keyboard, a knob event of the head unit, a left and right arrow key event of the remote control, a scroll wheel event of the mouse, a two-finger slide event of the touchpad, a watch crown event of the watch, and a touchscreen event). After receiving any interaction event, the unified interaction framework may identify the interaction event as an interaction behavior for changing a progress, adapt a behavior parameter (a progress change amount), and call back an onChangeProgress interface in the registered Listener to trigger the progress bar widget to refresh the progress.

It can be learned that in the method 300, behavior identification of the interaction event is performed by the unified interaction framework, and the widget no longer needs to identify the interaction event, and also does not need to process the parameter of the interaction event. The widget may directly execute the interaction behavior identified by the unified interaction framework. Therefore, the widget does not need to adapt to the interactive device. When an Android system needs to adapt to a newly added interactive device, a developer can perform adaptation development on the unified interaction framework once to adapt the newly added interactive device for a plurality of widgets, so that development workload is reduced.

Figure 6:
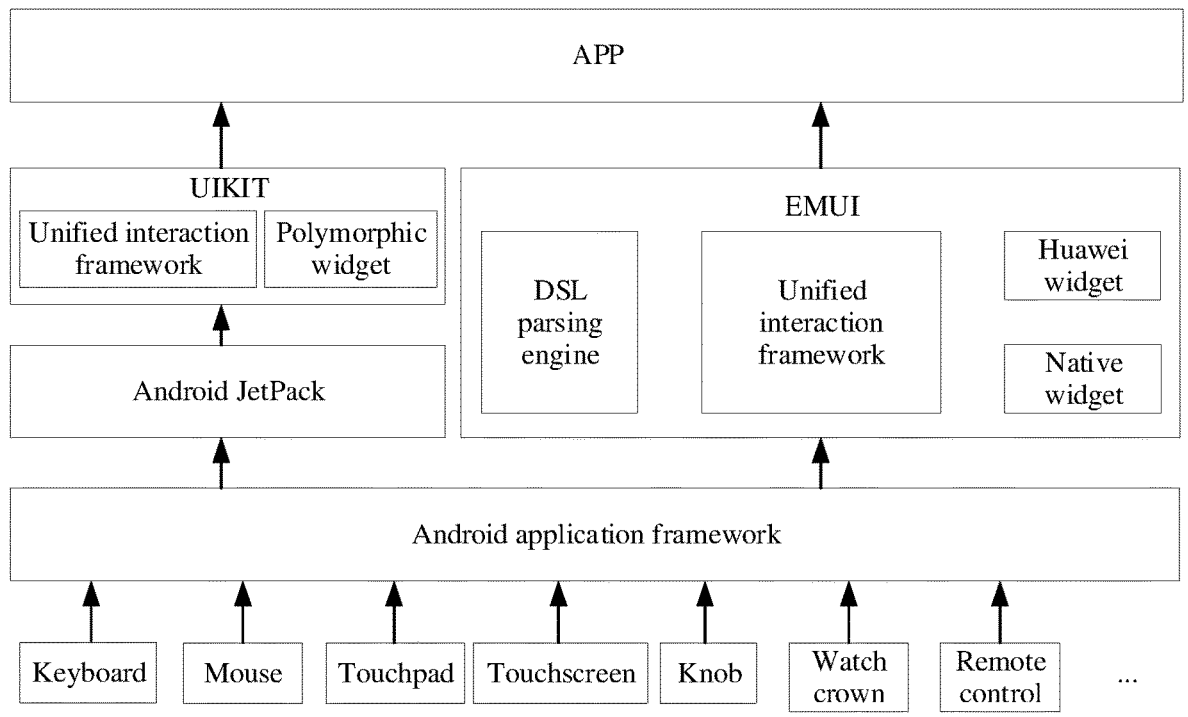
FIG. 6 is a schematic diagram of several manners for making an interaction behavior take effect according to an embodiment of this application.

There are various types of widgets, and different widgets have different capabilities. Therefore, the unified interaction framework may use different invoking manners for different widgets, to make interaction behaviors take effect. FIG. 6 shows several manners for making an interaction behavior take effect according to this application.

Manner 1: Take effect by default.

After determining an interaction behavior corresponding to an interaction event, the unified interaction framework may directly invoke a widget whose interaction capability is in an enabled state to execute the interaction behavior. For example, interaction functions in a Huawei widget and some native widgets in an EMUI and a polymorphic widget in a Huawei front-end framework (UIKIT) take effect by default.

Manner 2: Interaction is performed through an enable API.

The enable API is an API that can activate an interaction capability of a widget. For some widgets whose interaction capability is disabled by default, the widgets provide enable APIs, so that APPs can activate interaction capabilities of these widgets through the enable APIs. For example, an image zooming function performed by an ImageView widget based on "Ctrl+scroll wheel" is disabled by default. An APP can activate the image zooming function of the ImageView widget through an enable API. If the unified interaction framework identifies that a combined interaction behavior corresponding to "Ctrl+scroll wheel" is image zooming, the ImageView widget may be invoked to perform image zooming.

Manner 3: Interaction is performed through a registration callback API.

The registration callback interface enables a widget to invoke an APP to refresh data. When an interaction behavior relates to data refreshing, the widget can invoke the APP through the registration callback API to refresh data. For example, when the user performs an operation such as "Ctrl+V" on a list interface, a list widget needs to schedule a list APP to refresh data. In this case, the list widget may invoke the list APP through a registration callback API to refresh data.

Manner 4: Take effect through the DSL.

The manner 2 and the manner 3 show newly added capabilities of an EMUI relative to the Android open-source project (AOSP). Some third-party APPs (for example, some APPs that are not integrated with a Huawei SDK or do not use a Huawei UIKIT) cannot identify newly added enable APIs and registration callback APIs in the EMUI. Therefore, newly added widget interaction capabilities in the EMUI cannot be obtained. In this case, the EMUI may parse out configuration information from a DSL profile through a DSL parsing engine, and configure the enable API and the registration callback API based on the configuration information. In this way, a widget can invoke the third-party APP through the registration callback API, and the third-party APP can also invoke the widget through the enable API. The third-party APP can obtain an enhanced widget interaction capability without integrating an SDK of the EMUI. The EMUI may directly provide interfaces for third-party APPs, or may provide interfaces for third-party APPs through a UIKIT. The UIKIT may use a DSL parsing engine capability of the EMUI.

In addition, when the third-party APP is not installed on the EMUI, the DSL profile is not read, and a function of the third-party APP is not affected. Therefore, the third-party APP does not need to modify code, so that multi-platform normalization of APP code is implemented and adaptation costs of the third-party APP is reduced.

The following describes in detail the manner of making an interaction behavior take effect through the DSL.

A JavaScript object notation (JSON) profile may be placed in an assets directory. The DSL parsing engine parses the JSON profile, configures an enable API and a registration callback API, so that a third-party APP can use a function of a unified interaction framework in an EMUI.

The JSON profile may be used to configure global functions or a function of a single widget. For example, to implement image zooming by pressing Ctrl and scrolling the wheel, an enable API may be configured in the following manner:

{
"meta": {
 "version": "11.0.001"
},
"app": {/enabling is performed globally in the application
 "zoomable": true,
},
"layout": {
 "R.layout.mainpage": {
  "R.id.widget": {/enabling is performed for a single widget
   "zoomable": true,
  }
 }
}
}

The "app" label is used to configure image zooming functions of all widgets in the APP. If a value of "zoomable" is true, the image zooming functions of all the widgets in the APP are enabled. The "layout" label is used to configure an independent zooming function for a specific widget on a specified layout page. If a value of "zoomable" is true, the image zooming function of the widget is enabled. In this embodiment, an enable API of a widget may be flexibly configured based on a requirement.

For a registration callback interface, a JSON profile may be configured in the following manner:

1. Set a TAG.

ImageView is used as an example. The following identifier (ID) may be defined: ./res/values/ids.xml <item type="id" name="huawei_uikitdsl_tagid_zoom"/>

Then, a customized zooming class is defined: ./com/sample/ImageViewImplSample.java

```
public boolean onZoomSample (int action, KeyEvent event) {
    // do something
}
```

Subsequently, an instance of the class is set to an instance of ImageView by using the TAG: ./com/sample/MainActivity.java

```
public void buildView ( . . . ) {ImageView imageView=findViewById (R.id.widget);
    ImageViewImplSample sample=new ImageViewImplSample ( );
    imageView.setTag (R.id.huawei_uikitdsl_tagid_zoom, sample);
}
```

2. Configure a script file: ./assets/easygo.json (only an example of content in the body is provided herein)

```
{
"meta": {
    "version": "11.0.001"
},
"layout": {
    "R.layout.mainpage": {
        "R.id.widget": {
            "onZoom": "com.sample.ImageViewImplSample$onZoomSample"
        }
    }
}
}
```

The "R.layout.mainpage" label specifies a layout ID, "R.id.widget" specifies an ID of ImageView in the layout, and "onZoom" specifies a zooming method. The DSL parsing engine encapsulates a method for implementing onZoomSample and registers the method with ImageView, to replace a default zooming method.

The foregoing describes in detail the method 300 for processing an interaction event provided in this application. The following describes two embodiments for processing an interaction event with reference to specific scenarios.

Interaction events triggered by some interactive devices do not have clear start identifiers and end identifiers. The unified interaction framework may select some specific interaction events from such interaction events as a start interaction event or an end interaction event, or the unified interaction framework may fit some events at a specific moment as a start interaction event or an end interaction event.

Figure 7:
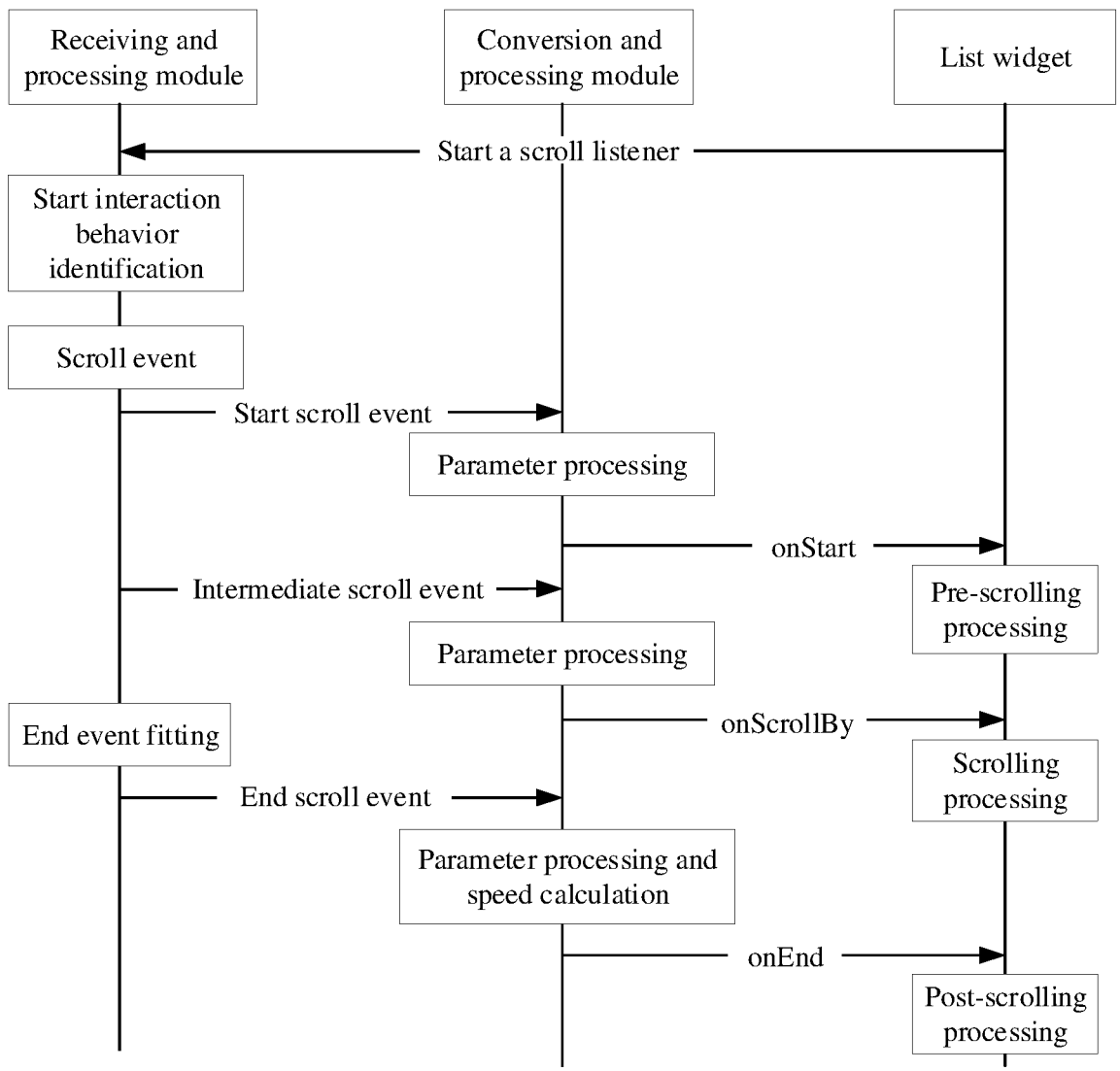
FIG. 7 is a schematic diagram of a method for processing a list scroll event according to this application.

FIG. 7 shows a method for processing a list scroll event of a watch crown.

On a touchscreen, an ACTION_DOWN event is generated when a finger touches the touchscreen, an ACTION_MOVE event is generated when the finger slides, and an ACTION_UP event is generated when the finger leaves. Therefore, for a list scroll operation performed through touch control, there is clear start time and clear end time. An interaction event generated by rotation of the watch crown is a discrete scroll event (ACTION_SCROLL), and there is no clear start identifier and end identifier. If it needs to keep effects of list scrolling consistent with those of touch interaction, a start event, an end event, and a current speed at which a list scrolls when the operation ends in one process of operating the watch crown need to be identified. A main process is shown in FIG. 7.

List widgets are, for example, ListView and ScrollView, may instantiate OnScrollListener to implement three methods: onStart, onScrollBy, and onEnd, and register the three methods with a unified interaction framework. The list widget only needs to focus on a UI interaction function of the list widget, and does not need to focus on list scroll event identification, parameter conversion, scrolling speed calculation, and whether the list scroll event comes from a watch crown or a mouse scroll wheel.

The unified interaction framework starts behavior identification based on an interaction behavior concerned by the list widget. Because the interaction event generated by rotation of the watch crown does not have a start identifier and an end identifier, the unified interaction framework needs to define a start identifier and an end identifier for one interaction when performing behavior identification.

For example, the unified interaction framework may use, as a start scroll event, a scroll event detected for the first time after a scroll listener (OnScrollListener) is registered, and call back onStart to indicate the list widget to perform pre-scrolling processing. The pre-scrolling processing may be adjusting a current list state, for example, stopping a previous time of scrolling. When the watch crown is stationary, no scroll event is triggered. In this case, the unified interaction framework may fit a scroll event when determining that the watch crown is stationary, use the scroll event as an end scroll event, calculate a scrolling speed, and then call back onEnd to trigger post-scrolling processing of the list. The post-scrolling processing may be fling processing, that is, processing in which the scrolling speed of the list gradually decreases from a non-zero speed to 0. A scroll event obtained after the unified interaction framework obtains the start scroll event and before the unified interaction framework obtains the end scroll event is an intermediate scroll event. The unified interaction framework may perform normalization processing on an event value (usually related to an angle of operating the watch crown) in the intermediate scroll event (an ACTION_SCROLL event) and convert the event value to a distance pixel value indicating a distance for which the list needs to scroll. Then, the unified interaction framework calls back onScrollBy to trigger list scrolling.

In the foregoing process, the list widget does not need to sense a specific type of an interactive device, and a list widget applicable to the mouse scroll wheel is also applicable to watch crown rotation without a need of secondary development. In addition, in this embodiment, an application scenario of the list widget is extended, and user experience is enhanced.

Figure 8:
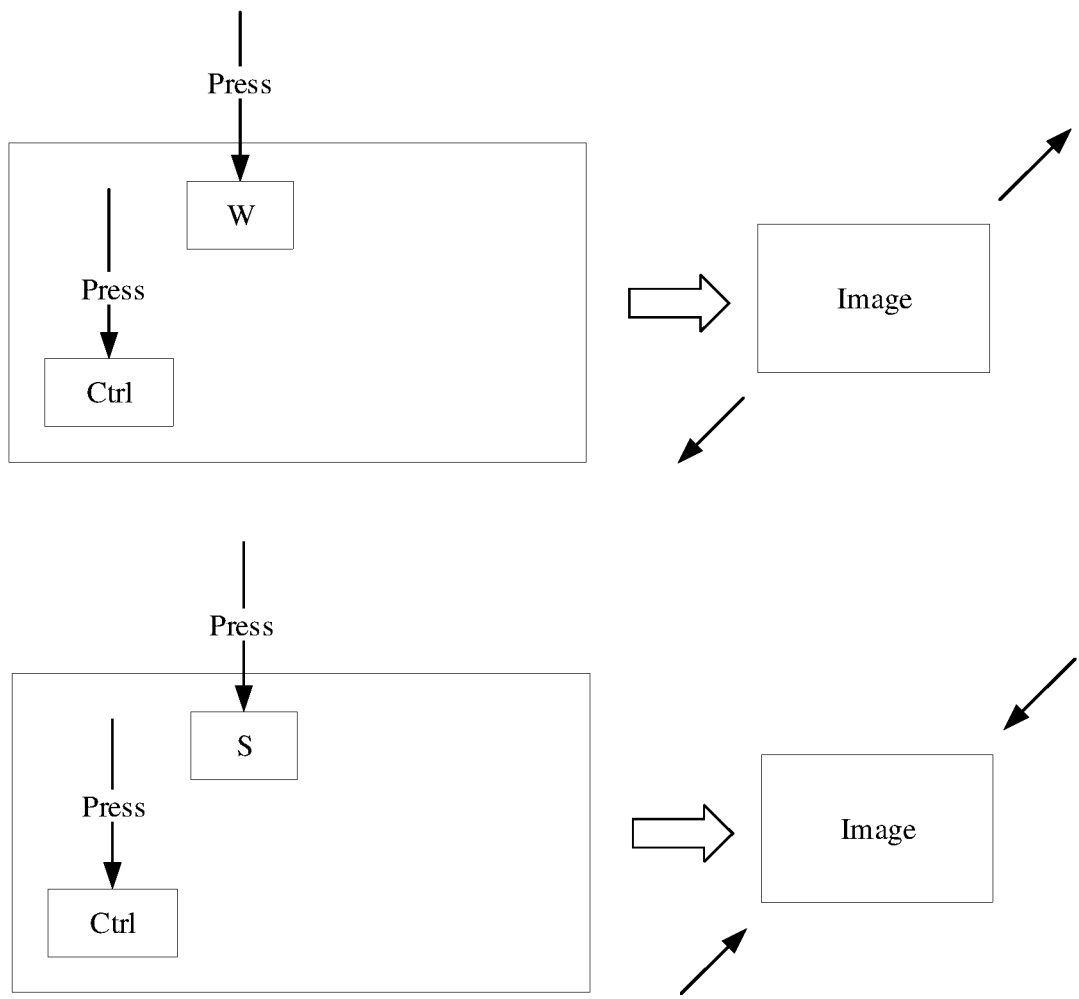
FIG. 8 is a schematic diagram of a method for processing a zooming event according to an embodiment of this application.

FIG. 8 shows a method for processing a zooming event.

A Windows photo application supports an image zooming function performed by "Ctrl+scroll wheel". The function may be implemented in an Android system based on a unified interaction framework.

For example, an ImageView widget may use a capability of the unified interaction framework to implement an OnZoomListener interface class (including an onZoom method for implementing zooming logic). The ImageView widget may register a combined interaction behavior of image zooming in the unified interaction framework, to be specific, register an interface instance (onZoom) with the unified interaction framework. Then, after obtaining a Ctrl event and a scroll wheel event, the unified interaction framework determines that a combined interaction behavior of the two interaction events is image zooming concerned by the ImageView widget, and may call back onZoom to implement a zooming function of the ImageView widget.

For an interactive device that does not have a mouse, for example, a Pad, the unified interaction framework may also provide the foregoing zooming function to facilitate image zooming on the Pad. For example, on a basis of supporting "Ctrl+scroll wheel", a developer may modify the unified interaction framework, so that the unified interaction framework supports image zooming triggered by "Ctrl+S/W".

The ImageView widget may register a combined interaction behavior of image zooming in the unified interaction framework. Then, after obtaining a Ctrl event and an S/W event, the unified interaction framework determines that a combined interaction behavior of the two interaction events is image zooming concerned by the ImageView widget, and may call back onZoom to implement a zooming function of the ImageView widget.

It can be learned that functions of identifying and processing an interaction event is decoupled from a function of making an interaction behavior take effect. The unified interaction framework focuses on identification and processing of the interaction event. The widget focuses on making the interaction behavior take effect and do not need to focus on identification and processing of the interaction event. Widgets that support a same interaction behavior can reuse a capability of the unified interaction framework. When a software system needs to adapt to a newly added interactive device, a developer can perform adaptation development on the unified interaction framework once to adapt the newly added interactive device for a plurality of widgets, so that development workload is reduced, and interaction experience consistency is improved.

The foregoing describes in detail an example of the method for processing an interaction event provided in this application. It may be understood that, to implement the foregoing functions, a corresponding apparatus includes a corresponding hardware structure and/or software module for executing each function. A person skilled in the art should easily be aware that, in combination with units and algorithm steps of the examples described in embodiments disclosed in this specification, this application can be implemented by hardware or a combination of hardware and computer software. Whether a function is performed by hardware or hardware driven by computer software depends on particular applications and design constraints of the technical solutions. A person skilled in the art may use different methods to implement the described functions for each particular application, but it should not be considered that the implementation goes beyond the scope of this application.

In this application, an apparatus for processing an interaction event may be divided into functional units based on the foregoing method examples. For example, each functional unit may be obtained through division based on each function, or two or more functions may be integrated into one unit. The integrated unit may be implemented in a form of hardware, or may be implemented in a form of a software functional unit. It should be noted that, in this application, division into the units is an example, and is merely logical function division. During actual implementation, another division manner may be used.

Figure 9:
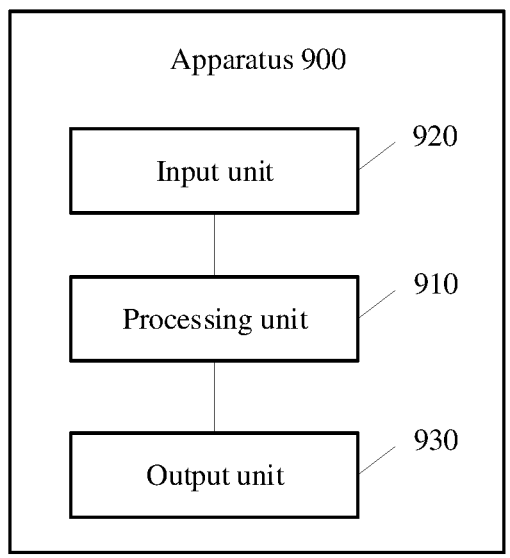
FIG. 9 is a schematic diagram of another apparatus for processing an interaction task according to an embodiment of this application.

FIG. 9 is a schematic diagram of a structure of an apparatus for processing an interaction event according to this application. The apparatus 900 includes a processing unit 910 and an input unit 920. The input unit 920 can perform an input operation or an obtaining operation under control of the processing unit 910.

The input unit 920 is configured to obtain at least one interaction event.

The processing unit 910 is configured to: determine an interaction behavior corresponding to the at least one interaction event; and invoke a widget corresponding to the interaction behavior to execute the interaction behavior.

Optionally, the processing unit 910 is specifically configured to: invoke, through a behavior enable API registered by the widget, the widget to execute the interaction behavior.

Optionally, the processing unit 910 is further configured to: configure an enable API and/or a registration callback API by using a DSL profile, where the widget can be invoked by an APP through the enable API, and the widget can invoke the APP through the registration callback API.

Optionally, before the invoking a widget corresponding to the interaction behavior to execute the interaction behavior, the input unit 920 is further configured to: receive registration information from the widget, where the registration information indicates a correspondence between the interaction behavior and the widget.

Optionally, the processing unit 910 is further configured to generate a behavior parameter based on an event value of the at least one interaction event; and the apparatus 900 further includes an output unit 930, configured to send the behavior parameter to the widget.

Optionally, the behavior parameter includes a behavior amplitude value, the behavior amplitude value is positively correlated to the event value of the at least one interaction event, the behavior amplitude value is positively correlated to a transform coefficient, and there is a correspondence between the transform coefficient and a type of an interactive device corresponding to the at least one interaction event.

Optionally, the correspondence between the transform coefficient and the type of the interactive device includes: the transform coefficient is positively correlated to a UI size of the interactive device.

Optionally, the at least one interaction event includes a plurality of interaction events, and the interaction behavior includes: a combined interaction behavior of the plurality of interaction events.

Optionally, the at least one interaction event includes a start scroll event, an intermediate scroll event, and an end scroll event.

The start scroll event is a scroll event detected for the first time after a scroll listener is started, or a scroll event generated for the first time after an end scroll event is generated.

The intermediate scroll event is a scroll event generated within a preset time period after the start scroll event is generated.

The end scroll event is a scroll event fitted when no scroll event is generated within the preset time period after the start scroll event or the intermediate scroll event is generated.

The interaction behavior includes:
  pre-scrolling processing corresponding to the start scroll event;
  scrolling processing corresponding to the intermediate scroll event; and
  post-scrolling processing corresponding to the end scroll event.

For a specific manner in which the apparatus 900 performs the method for processing an interaction event and generated beneficial effects, refer to related descriptions in the method embodiment.

The apparatus 900 is an example of the apparatus for processing an interaction event. Optionally, the apparatus for processing an interaction event may further have a structure shown in FIG. 10.

Figure 10:
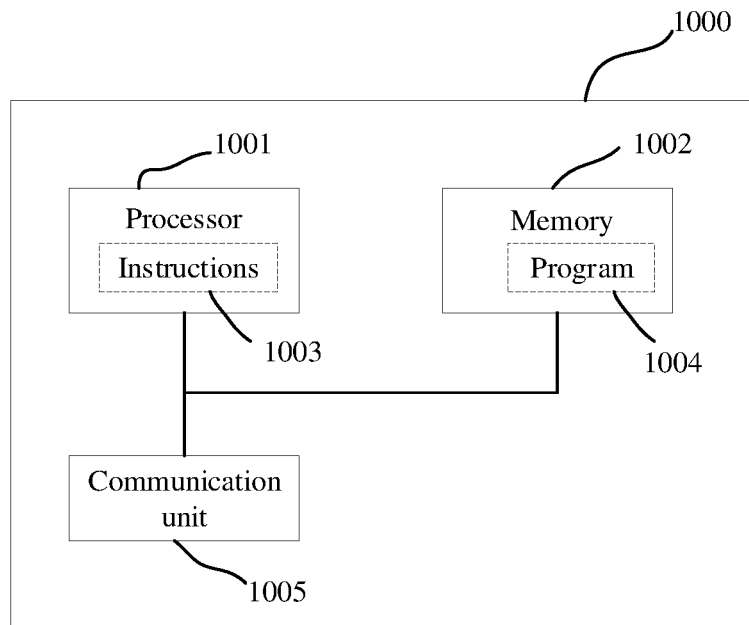
FIG. 10 is a schematic diagram of an electronic device for processing an interaction task according to an embodiment of this application.

FIG. 10 is a schematic diagram of a structure of an electronic device for processing an interaction event according to this application. The device 1000 may be configured to implement the method described in the foregoing method embodiment. The device 1000 may be a terminal device or a chip.

The device 1000 includes one or more processors 1001, and the one or more processors 1001 may support the device 1000 in implementing the method in the method embodiment. The processor 1001 may be a general-purpose processor or a dedicated processor. For example, the processor 1001 may be a central processing unit (CPU). The CPU may be configured to: control the device 1000, execute a software program, and process data of the software program. The device 1000 may further include a communication unit 1005, configured to implement signal input (receiving) and/or signal output (sending).

For example, the device 1000 may be a chip. The communication unit 1005 may be an input circuit and/or an output circuit of the chip, or the communication unit 1005 may be a communication interface of the chip. The chip may be used as a component of a terminal device or another electronic device.

For another example, the device 1000 may be a terminal device. The communication unit 1005 may be a transceiver of the terminal device, or the communication unit 1005 may be a transceiver circuit of the terminal device. The device 1000 may have the structure shown in FIG. 1. When the device 1000 has the structure shown in FIG. 1, the processor 1001 may be the processor 110, the memory 1002 may be the internal memory 121, and the communication unit 1005 may be an interface between the processor 110 and the sensor module 180.

The device 1000 may include one or more memories 1002, where the memory 1002 stores a program 1004, and the program 1004 may be run by the processor 1001 to generate instructions 1003, so that the processor 1001 performs, according to the instructions 1003, the method described in the foregoing method embodiment. Optionally, the memory 1002 may further store data (for example, code for executing the method 300). Optionally, the processor 1001 may further read the data stored in the memory 1002. The data and the program 1004 may be stored at a same storage address, or the data and the program 1004 may be stored at different storage addresses.

The processor 1001 and the memory 1002 may be separately disposed, or may be integrated together, for example, integrated on a system-on-a-chip (SOC) of the terminal device.

For a specific manner in which the processor 1001 performs the method embodiment, refer to related descriptions in the method embodiment.

It should be understood that steps in the foregoing method embodiment may be implemented by using a logic circuit in a hardware form or instructions in a software form in the processor 1001. The processor 1001 may be a CPU, a digital signal processor (DSP), an application-specific integrated circuit (ASIC), a field programmable gate array (FPGA), or another programmable logic device, for example, a discrete gate, a transistor logic device, or a discrete hardware component.

This application further provides a computer program product. When the computer program product is executed by the processor 1001, the method according to any method embodiment of this application is implemented.

The computer program product may be stored in the memory 1002. For example, the computer program product is the program 1004. After processing processes such as preprocessing, compilation, assembly, and linking, the program 1004 is finally converted into an executable target file that can be executed by the processor 1001.

This application further provides a computer-readable storage medium, which stores a computer program. When the computer program is executed by a computer, the method according to any method embodiment of this application is implemented. The computer program may be a high-level language program, or may be an executable target program.

The computer-readable storage medium is, for example, the memory 1002. The memory 1002 may be a volatile memory or a nonvolatile memory, or the memory 1002 may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM) and is used as an external cache. By way of example, and not limitation, RAMs in many forms may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It may be clearly understood by a person skilled in the art that, for ease and brevity of description, for a specific working process and a generated technical effect of the foregoing apparatus and device, refer to a corresponding process and technical effect in the foregoing method embodiment, and details are not described herein again.

In the several embodiments provided in this application, the disclosed system, apparatus, and method may be implemented in other manners. For example, some features of the method embodiment described above may be ignored or not performed. The described apparatus embodiments are merely examples. Division into the units is merely logical function division and may be other division during actual implementation. A plurality of units or components may be combined or integrated into another system. In addition, coupling between the units or coupling between the components may be direct coupling or indirect coupling, and the coupling may include an electrical connection, a mechanical connection, or another form of connection.

Sequence numbers do not mean execution sequences in various embodiments of this application. Execution sequences of processes should be determined based on functions and internal logic of the processes, and should not be construed as any limitation on the implementation processes of embodiments of this application.

In addition, the term "and/or" in this specification describes only an association relationship between associated objects and represents that three relationships may exist. For example, A and/or B may represent the following three cases: Only A exists, both A and B exist, and only B exists. In addition, the character "/" in this specification generally indicates an "or" relationship between the associated objects.

It should be noted that, in embodiments of this application, terms such as "first" and "second" are merely used for the purpose of distinction in description, and cannot be understood as indicating or implying relative importance, or as indicating or implying a sequence. A feature limited by "first" and "second" may explicitly or implicitly include one or more features. In the descriptions of embodiments of this application, the term such as "example" or "for example" is used to represent giving an example, an illustration, or a description. Any embodiment or design scheme described as an "example" or "for example" in embodiments of this application should not be explained as being more preferred or having more advantages than another embodiment or design scheme. Exactly, use of the term such as "example" or "for example" is intended to present a relative concept in a specific manner.

In conclusion, the foregoing descriptions are merely example embodiments of the technical solutions of this application, but are not intended to limit the protection scope of this application. Any modification, equivalent replacement, or improvement made without departing from the principle of this application shall fall within the protection scope of this application.

What is claimed is:

1. A method comprising:
   obtaining, by a unified interaction framework in an electronic device, at least one interaction event triggered by operation(s) of a user on the electronic device, wherein the unified interaction framework is comprised in a user interface (UI) framework layer and interacts between a widget and an operation system (OS) layer;
   determining, by the unified interaction framework in the electronic device, an interaction behavior corresponding to the at least one interaction event, wherein the unified interaction framework comprises a correspondence between interaction behaviors and interaction operations of different interaction devices, wherein different interaction operations of the different interaction devices correspond to a same interaction behavior in the correspondence, and wherein the interaction behavior corresponding to the at least one interaction event indicates a task executable by the electronic device;
   receiving, by the unified interaction framework in the electronic device, registration information from the widget, wherein the registration information indicates a correspondence between the interaction behavior corresponding to the at least one interaction event and the widget; and
   invoking, by the unified interaction framework in the electronic device, and based on the determined interaction behavior matching the interaction behavior from the registration information of the widget, the widget to execute the interaction behavior.

2. The method according to claim 1, wherein invoking, by the unified interaction framework in the electronic device, and based on the determined interaction behavior matching the interaction behavior from the registration information of the widget, the widget to execute the interaction behavior, comprises:
   invoking, by the unified interaction framework in the electronic device through a behavior enable application programming interface (API) registered by the widget, and based on the determined interaction behavior matching the interaction behavior from the registration information of the widget, the widget to execute the interaction behavior.

3. The method according to claim 1, wherein the method further comprises:
   configuring, by the unified interaction framework in the electronic device, an enable application programming interface (API) or a registration API using a domain specific language (DSL) profile, wherein the widget is invokable by an application (APP) through the enable API, and the widget is configured to invoke the APP through the registration API.

4. The method according to claim 1, wherein the method further comprises:
   generating, by the unified interaction framework in the electronic device, a behavior parameter based on an event value of the at least one interaction event; and
   sending, by the unified interaction framework in the electronic device, the behavior parameter to the widget.

5. The method according to claim 4, wherein the behavior parameter comprises a behavior amplitude value, the behavior amplitude value is positively correlated to the event value of the at least one interaction event, the behavior amplitude value is positively correlated to a transform coefficient, and there is a correspondence between the transform coefficient and a type of an interactive device corresponding to the at least one interaction event, the interactive device being configured to receive a user operation.

6. The method according to claim 5, wherein the transform coefficient is positively correlated to a user interface (UI) size of the interactive device.

7. The method according to claim 1, wherein the at least one interaction event comprises a plurality of interaction events, and the interaction behavior comprises a combined interaction behavior of the plurality of interaction events.

8. The method according to claim 1, wherein the at least one interaction event comprises a start scroll event, an intermediate scroll event and an end scroll event triggered by a scroll operation of the user on the electronic device, wherein
   the start scroll event is a scroll event detected for the first time after a scroll listener is started at the electronic device, or a scroll event generated for the first time after the end scroll event is generated at the electronic device;
   the intermediate scroll event is a scroll event generated within a preset time period after the start scroll event is generated;
   the end scroll event is a scroll event fitted when no scroll event is generated within the preset time period after the start scroll event or the intermediate scroll event is generated; and
   the interaction behavior comprises one of following:
      pre-scrolling processing corresponding to the start scroll event;
      scrolling processing corresponding to the intermediate scroll event; or
      post-scrolling processing corresponding to the end scroll event.

9. A device comprising:
   a non-transitory memory configured to store a program instruction; and
   a processor configured to execute the program instruction to cause a unified interaction framework that is comprised in a user interface (UI) framework layer and that interacts between a widget and an operation system (OS) layer in the device to perform:

obtaining at least one interaction event triggered by operation(s) of a user on the device;

determining an interaction behavior corresponding to the at least one interaction event, wherein the unified interaction framework comprises a correspondence between interaction behaviors and interaction operations of different interaction devices, wherein different interaction operations of the different interaction devices correspond to a same interaction behavior in the correspondence, and wherein the interaction behavior corresponding to the at least one interaction event indicates a task executable by the device;

receiving registration information from the widget, wherein the registration information indicates a correspondence between the interaction behavior corresponding to the at least one interaction event and the widget; and invoking, based on the determined interaction behavior matching the interaction behavior from the registration information of the widget, the widget to execute the interaction behavior.

10. The device according to claim 9, wherein the unified interaction framework in the device is further caused to perform:

invoking, through a behavior enable application programming interface (API) registered by the widget, and based on the determined interaction behavior matching the interaction behavior from the registration information of the widget, the widget to execute the interaction behavior.

11. The device according to claim 9, wherein the unified interaction framework in the device is further caused to perform:

configuring an enable application programming interface (API) or a registration API using a domain specific language DSL profile, wherein the widget is invokable by an application (APP) through the enable API, and the widget is configured to invoke the APP through the registration API.

12. The device according to claim 9, wherein the unified interaction framework in the device is further caused to perform:

generating a behavior parameter based on an event value of the at least one interaction event; and sending the behavior parameter to the widget.

13. The device according to claim 12, wherein the behavior parameter comprises a behavior amplitude value, the behavior amplitude value is positively correlated to the event value of the at least one interaction event, the behavior amplitude value is positively correlated to a transform coefficient, and there is a correspondence between the transform coefficient and a type of an interactive device corresponding to the at least one interaction event, the interactive device being configured to receive a user operation.

14. The device according to claim 13, wherein the transform coefficient is positively correlated to a user interface (UI) size of the interactive device.

15. The device according to claim 9, wherein the at least one interaction event comprises a plurality of interaction events, and the interaction behavior comprises a combined interaction behavior of the plurality of interaction events.

16. The device according to claim 9, wherein the at least one interaction event comprises a start scroll event, an intermediate scroll event and an end scroll event triggered by a scroll operation of the user on the device, wherein the start scroll event is a scroll event detected for the first time after a scroll listener is started at the device, or a scroll event generated for the first time after the end scroll event is generated at the device;

the intermediate scroll event is a scroll event generated within a preset time period after the start scroll event is generated;

the end scroll event is a scroll event fitted when no scroll event is generated within the preset time period after the start scroll event or the intermediate scroll event is generated; and the interaction behavior comprises one of following:
  pre-scrolling processing corresponding to the start scroll event;
  scrolling processing corresponding to the intermediate scroll event; or
  post-scrolling processing corresponding to the end scroll event.

17. A non-transitory computer readable medium comprising program instructions, when executed by a processor of an electronic device, cause a unified interaction framework that is comprised in a user interface (UI) framework layer and that interacts between a widget and an operation system (OS) layer in the electronic device to:

obtain at least one interaction event triggered by operation(s) of a user on the electronic device;

determine an interaction behavior corresponding to the at least one interaction event, wherein the unified interaction framework comprises a correspondence between interaction behaviors and interaction operations of different interaction devices, wherein different interaction operations of the different interaction devices correspond to a same interaction behavior in the correspondence, and wherein the interaction behavior corresponding to the at least one interaction event indicates a task executable by the electronic device;

receive registration information from the widget, wherein the registration information indicates a correspondence between the interaction behavior corresponding to the at least one interaction event and the widget; and invoke, based on the determined interaction behavior matching the interaction behavior from the registration information of the widget, the widget to execute the interaction behavior.

18. The non-transitory computer readable medium according to claim 17, wherein the program instructions, when executed by the processor of the electronic device, cause the unified interaction framework in the electronic device further to:

invoke, through a behavior enable application programming interface (API) registered by the widget, and based on the determined interaction behavior matching the interaction behavior from the registration information of the widget, the widget to execute the interaction behavior.

19. The non-transitory computer readable medium according to claim 17, wherein the program instructions, when executed by the processor of the electronic device, cause the unified interaction framework in the electronic device further to:

configure an enable API or a registration API using a domain specific language DSL profile, wherein the widget is invokable by an application (APP) through the enable API, and the widget is configured to invoke the APP through the registration API.

20. The non-transitory computer readable medium according to claim 17, wherein when executed by the processor of the electronic device, cause the unified interaction framework in the electronic device further to:
   generate a behavior parameter based on an event value of the at least one interaction event; and
   send the behavior parameter to the widget.

* * * * *